United States Patent
Matthews et al.

(10) Patent No.: US 10,432,429 B1
(45) Date of Patent: *Oct. 1, 2019

(54) EFFICIENT TRAFFIC MANAGEMENT

(71) Applicant: Innovium, Inc., San Jose, CA (US)

(72) Inventors: William Brad Matthews, San Jose, CA (US); Paul Kim, Fremont, CA (US); Bruce Kwan, Sunnyvale, CA (US); Puneet Agarwal, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 15/290,769

(22) Filed: Oct. 11, 2016

Related U.S. Application Data

(63) Continuation of application No. 15/045,039, filed on Feb. 16, 2016, now abandoned.

(51) Int. Cl.
*H04L 12/54* (2013.01)
*H04L 12/863* (2013.01)
*H04L 29/06* (2006.01)
*H04L 29/08* (2006.01)
*H04L 12/801* (2013.01)

(52) U.S. Cl.
CPC .......... *H04L 12/5602* (2013.01); *H04L 47/29* (2013.01); *H04L 47/50* (2013.01); *H04L 67/2852* (2013.01); *H04L 69/28* (2013.01)

(58) Field of Classification Search
None
See application file for complete search history.

(56) References Cited

U.S. PATENT DOCUMENTS

| | | | |
|---|---|---|---|
| 3,673,395 A | 6/1972 | Tripp | |
| 4,985,859 A | 1/1991 | Rauner et al. | |
| 5,457,793 A | 10/1995 | Elko et al. | |
| 5,724,362 A | 3/1998 | Lau | |
| 5,923,247 A | 7/1999 | Dowden et al. | |

(Continued)

OTHER PUBLICATIONS

United States Patent and Trademark Office, U.S. Appl. No. 14/973,541, Notice of Allowance dated Sep. 13, 2018.

(Continued)

*Primary Examiner* — Jamaal Henson
(74) *Attorney, Agent, or Firm* — Wong & Rees LLP; Karl T. Rees

(57) ABSTRACT

A token bucket or leaky bucket is maintained at least partially through the use of two separate counters. A full counter, is maintained in relatively lower cost memory, and indicates the amount of tokens within the bucket on a potentially delayed basis. An intermediate counter is stored in a relatively higher cost memory that supports high access rates, and indicates the amount of tokens assigned (or unassigned) to the bucket since the full counter was last updated. Various adjustment processes remove (or add) tokens as needed for performing tasks. A background process updates the full counter from the corresponding intermediate counter on a periodic, scheduled, or other basis. The buckets are replenished (or deleted) with tokens periodically at assigned rates. Traffic management or other decisions are based on the bucket's current status, as determined from the full counter during the background process and then stored in the higher cost memory.

21 Claims, 6 Drawing Sheets

(56) References Cited

U.S. PATENT DOCUMENTS

| | | | |
|---|---|---|---|
| 6,363,411 B1 | 3/2002 | Dugan et al. | |
| 6,400,715 B1 * | 6/2002 | Beaudoin | H04L 49/25 370/392 |
| 6,527,370 B1 | 3/2003 | Courian et al. | |
| 6,646,604 B2 | 11/2003 | Anderson | |
| 6,658,568 B1 | 12/2003 | Ginter et al. | |
| 6,766,338 B1 | 7/2004 | Handley et al. | |
| 6,779,030 B1 | 8/2004 | Dugan et al. | |
| 7,246,156 B2 | 7/2007 | Ginter et al. | |
| 7,639,663 B1 | 12/2009 | Nerses et al. | |
| 7,855,960 B2 * | 12/2010 | Hinosugi | H04L 47/2441 370/230.1 |
| 7,890,509 B1 | 2/2011 | Pearcy et al. | |
| 7,921,024 B2 | 4/2011 | Hogan et al. | |
| 8,200,527 B1 | 6/2012 | Thompson et al. | |
| 8,270,952 B2 | 9/2012 | Raleigh | |
| 8,730,962 B2 * | 5/2014 | Aimoto | H04L 47/10 370/392 |
| 8,776,061 B2 | 7/2014 | Levin et al. | |
| 9,077,758 B1 | 7/2015 | McGovern et al. | |
| 9,215,159 B2 | 12/2015 | Raleigh et al. | |
| 9,401,869 B1 | 7/2016 | Tang et al. | |
| 9,420,002 B1 | 8/2016 | McGovern et al. | |
| 9,753,749 B2 | 9/2017 | Gatson et al. | |
| 9,813,285 B1 | 11/2017 | McGovern et al. | |
| 9,929,970 B1 * | 3/2018 | Matthews | H04L 47/70 |
| 2002/0065864 A1 | 5/2002 | Hartsell et al. | |
| 2003/0110344 A1 | 6/2003 | Szczepanek et al. | |
| 2004/0078105 A1 | 4/2004 | Moon et al. | |
| 2005/0108385 A1 | 5/2005 | Wechter et al. | |
| 2006/0126201 A1 | 6/2006 | Jain | |
| 2006/0294252 A1 | 12/2006 | Shoji et al. | |
| 2007/0140301 A1 | 6/2007 | Kailash et al. | |
| 2007/0174428 A1 | 7/2007 | Ran et al. | |
| 2008/0037553 A1 | 2/2008 | Gilmartin et al. | |
| 2008/0117816 A1 | 5/2008 | Stone et al. | |
| 2008/0120240 A1 | 5/2008 | Ginter et al. | |
| 2008/0183532 A1 | 7/2008 | Barnard et al. | |
| 2008/0201468 A1 | 8/2008 | Titus | |
| 2008/0243993 A1 | 10/2008 | Wang et al. | |
| 2009/0172682 A1 | 7/2009 | Bobak et al. | |
| 2009/0282096 A1 | 11/2009 | Kamrowski et al. | |
| 2010/0228854 A1 | 9/2010 | Morrison et al. | |
| 2011/0078519 A1 | 3/2011 | Yordanov et al. | |
| 2012/0278464 A1 | 11/2012 | Lehane et al. | |
| 2014/0214801 A1 | 7/2014 | Ciliberti | |
| 2014/0242939 A1 | 8/2014 | Salot et al. | |
| 2014/0270163 A1 * | 9/2014 | Merchan | H04L 9/0637 380/46 |
| 2015/0133076 A1 | 5/2015 | Brough | |
| 2015/0149611 A1 | 5/2015 | Lissack | |
| 2015/0222564 A1 | 8/2015 | Wheeler | |
| 2016/0014039 A1 | 1/2016 | Reddy et al. | |
| 2017/0060769 A1 | 3/2017 | Wires et al. | |
| 2017/0149931 A1 | 5/2017 | Lochhead et al. | |
| 2017/0235622 A1 | 8/2017 | Boyapalle et al. | |
| 2017/0235848 A1 | 8/2017 | Dusen et al. | |
| 2017/0257279 A1 | 9/2017 | Mishra et al. | |
| 2017/0257303 A1 | 9/2017 | Boyapalle et al. | |
| 2017/0288955 A1 | 10/2017 | Yin | |
| 2017/0344045 A1 | 11/2017 | Forbes, Jr. | |
| 2018/0091394 A1 | 3/2018 | Richards et al. | |
| 2018/0091413 A1 | 3/2018 | Richards et al. | |
| 2018/0167307 A1 | 6/2018 | Barry et al. | |

OTHER PUBLICATIONS

United States Patent and Trademark Office, U.S. Appl. No. 14/985,928, Final Office Action dated Sep. 19, 2018.

United States Patent and Trademark Office, U.S. Appl. No. 14/958,830, Non-Final Office Action dated Sep. 14, 2017.

United States Patent and Trademark Office, U.S. Appl. No. 14/958,830, Notice of Allowance dated Jan. 10, 2018.

United States Patent and Trademark Office, U.S. Appl. No. 14/985,928, Advisory Action dated Dec. 11, 2018.

United States Patent and Trademark Office, U.S. Appl. No. 14/985,928, Non-Final Office Action dated Jan. 28, 2019.

United States Patent and Trademark Office, U.S. Appl. No. 15/902,882, Non-Final Office Action dated Mar. 22, 2019.

* cited by examiner

FIG. 5                                                                                       500

| | 562a Full | 566 Thr |
|---|---|---|
| O1 | 0000147 | 0000200 |
| O2 | 0002987 | 0002000 |
| O3 | 0000013 | 0000200 |
| O4 | 0000401 | 0000400 |
| O5 | 0000898 | 0000900 |
| O6 | 0000096 | 0000200 |
| O7 | 0000002 | 0000200 |
| O8 | 0032548 | 0064000 |

| | 562b Full | 566 Thr |
|---|---|---|
| O1 | 0000147 | 0000200 |
| O2 | 0002987 | 0002000 |
| O3 | 0000021 | 0000200 |
| O4 | 0000394 | 0000400 |
| O5 | 0000898 | 0000900 |
| O6 | 0000096 | 0000200 |
| O7 | 0000002 | 0000200 |
| O8 | 0032548 | 0064000 |

| | 562c Full | 566 Thr |
|---|---|---|
| O1 | 0000147 | 0000200 |
| O2 | 0002987 | 0002000 |
| O3 | 0000021 | 0000200 |
| O4 | 0000394 | 0000400 |
| O5 | 0000902 | 0000900 |
| O6 | 0000097 | 0000200 |
| O7 | 0000002 | 0000200 |
| O8 | 0032548 | 0064000 |

| | 562d Full | 566 Thr |
|---|---|---|
| O1 | 0000147 | 0000200 |
| O2 | 0002987 | 0002000 |
| O3 | 0000021 | 0000200 |
| O4 | 0000394 | 0000400 |
| O5 | 0000902 | 0000900 |
| O6 | 0000097 | 0000200 |
| O7 | 0000003 | 0000200 |
| O8 | 0032543 | 0064000 |

| | 572a Int | 576a Sta |
|---|---|---|
| O1 | 00 | 0 |
| O2 | 00 | 1 |
| O3 | 08 | 0 |
| O4 | -07 | 1 |
| O5 | 03 | 0 |
| O6 | 02 | 0 |
| O7 | -02 | 0 |
| O8 | -01 | 0 |

| | 572b Int | 576b Sta |
|---|---|---|
| O1 | 01 | 0 |
| O2 | -01 | 1 |
| O3 | 00 | 0 |
| O4 | 00 | 0 |
| O5 | 04 | 0 |
| O6 | 01 | 0 |
| O7 | 00 | 0 |
| O8 | -03 | 0 |

| | 572c Int | 576c Sta |
|---|---|---|
| O1 | 00 | 0 |
| O2 | -03 | 1 |
| O3 | 02 | 0 |
| O4 | 00 | 0 |
| O5 | 00 | 1 |
| O6 | 00 | 0 |
| O7 | 01 | 0 |
| O8 | -05 | 0 |

| | 572d Int | 576d Sta |
|---|---|---|
| O1 | 02 | 0 |
| O2 | -02 | 1 |
| O3 | 04 | 0 |
| O4 | 01 | 0 |
| O5 | -01 | 1 |
| O6 | -01 | 0 |
| O7 | 00 | 0 |
| O8 | 00 | 0 | t0    t1    t2    t3

EFFICIENT TRAFFIC MANAGEMENT

PRIORITY CLAIM

This application claims benefit under 35 U.S.C. § 120 as a Continuation of application Ser. No. 15/045,039, filed Feb. 16, 2016, the entire contents of which is hereby incorporated by reference as if fully set forth herein. Applicant hereby rescinds any disclaimer of claim scope in the parent application(s) or the prosecution history thereof and advise the USPTO that the claims in this application may be broader than any claim in the parent application(s).

CROSS-REFERENCE TO RELATED APPLICATIONS

This application is related to U.S. patent application Ser. No. 14/958,830, entitled "Efficient Resource Tracking," by Matthews et al., filed Dec. 3, 2015; the entire contents of which are hereby incorporated by reference for all purposes as if fully set forth herein.

TECHNICAL FIELD

Embodiments relate generally to traffic management, and, more specifically, to techniques for efficiently implementing bucket-based traffic management mechanisms.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computing systems perform a large number of tasks using a finite number of resources. Rather than naively perform each task in the order in which it was received, a computing device may implement various resource scheduling and management techniques to ensure that the tasks are performed in an order that achieves various important objectives, such as ensuring that high priority tasks are performed within a certain amount of time or guaranteeing a minimum level of performance with respect to tasks that pertain to a certain requestor.

In some systems, tasks may be classified according to various classifications. A task management system may enforce various rules with respect to these classifications, such as ensuring that the rate at which the tasks for a given classification are performed conforms to certain minimum or maximum requirements. Bucket-based mechanisms are well-suited for enforcing such rules.

One type of bucket-based mechanism is a token bucket. One example use of a token bucket is as follows. Each classification of tasks is assigned to a different "bucket," which stores, conceptually, an amount of "tokens" for the classification. Before performing a task, the classification of the task is determined. An amount of tokens needed for the task (e.g. corresponding to a size of a resource needed for the task) is also determined. The bucket associated with the task is consulted to determine whether there are enough tokens in the bucket to perform the task. If so, then the tokens are removed from the bucket, and the task is "conformant" and performed. If there are not enough tokens, then the task is "non-conformant" and various non-conforming responses are possible, depending on the embodiment. These responses may include, for example, waiting to perform the task, skipping the task, lowering the priority of the task, and so forth. The bucket is replenished by adding new tokens periodically according to some replenishment rate, which can be adjusted for various purposes.

Another type of bucket-based mechanism is a leaky bucket. One example use of a leaky bucket is as follows. As with the token bucket, each classification is assigned to a different bucket. Each bucket is also assigned a capacity (i.e. maximum size). Again, the classification of the task is determined. Again, an amount of resources (hereinafter also referred to as tokens) needed for the task is determined. However, instead of removing the tokens from the bucket, the tokens are added to the bucket, so long as the bucket does not exceed the capacity of the bucket (i.e. is conformant). If the capacity of the bucket will be exceeded, then the task is in non-conformant, and the same non-conforming responses are possible. The bucket "leaks"—i.e. tokens are removed from the bucket—at a defined leak rate, which again can be adjusted for various purposes.

Of course, a number of variations on the above examples are possible, and the described techniques are relevant to bucket-based mechanisms in general rather than any specific algorithm.

Bucket-based mechanisms are often used for traffic management in networking devices, such as switches and routers. In this context, the tasks at issue typically relate to the processing of packets, cells, datagrams, or other data structures (collectively referred to herein as "messages"). For instance, the tasks may be sending or routing a message, inspecting a message, manipulating a message, and so forth. The classifications are referred to herein as traffic action control groups. Messages may be assigned to different traffic action control groups based on any suitable criteria, including, without limitation, labels, destination or sending addresses, destination or sending ports, destination or sending services, traffic classes, applications, protocols, and so forth. The networking device may employ various traffic management rules or algorithms to ensure that messages pertaining to certain traffic action control groups have certain qualities of service, such as guaranteed minimum or maximum sending rates.

For instance, traffic shaping is a network traffic management technique in which the processing of certain messages may be delayed to bring them into compliance with some guaranteed performance standard. As another example, traffic policing is a network traffic management technique that involves discarding and/or marking certain messages that do not comply with a contract or some other guarantee. Token buckets or leaky buckets are often utilized for these and other traffic management techniques.

For certain types of usage patterns in certain types of computer systems, such as with respect to traffic management in network switching devices, the frequency with which buckets must be updated requires that the memory used to store the buckets be capable of sustaining a high read and write rate. For instance, multi-ported memory is often required in such contexts, which can be of relatively high cost and reduced operating rate. Moreover, as the number of classifications to which a task may be assigned increases, the memory requirements also increase.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates an example schedule for updating buckets; and

DETAILED DESCRIPTION

Figure 1:
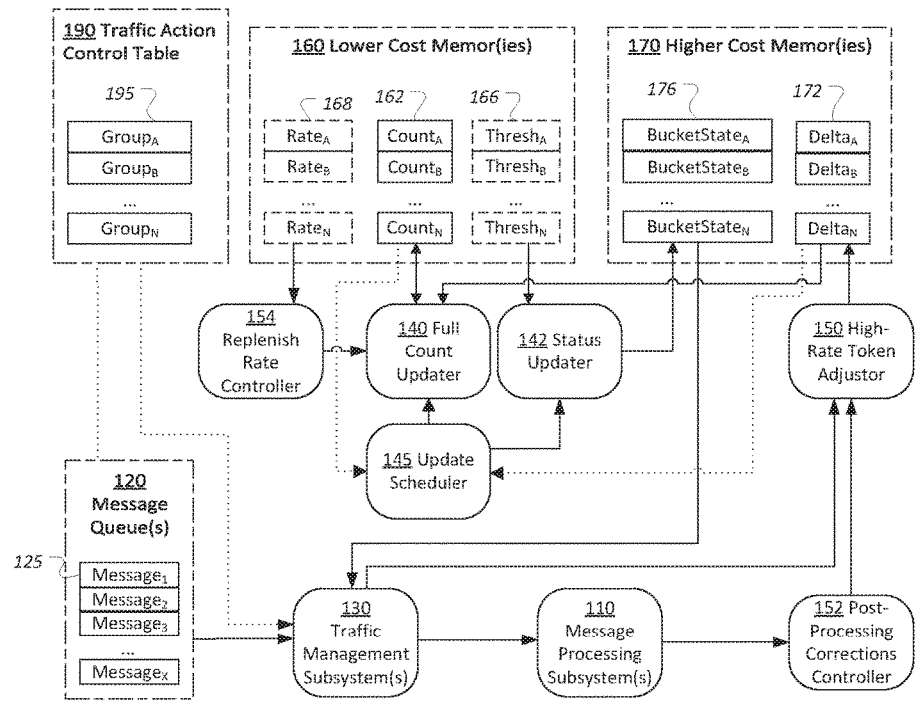
FIG. 1 is an illustrative view of various aspects of an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
2.1. Messages
2.2. Traffic Action Controls
2.3. Message Processing
2.4. Traffic Management
2.5. Full Counters
2.6. Bucket Status Information
2.7. Intermediate Counters
2.8. High-Rate Token Adjustment
2.9. Full Count Updater
2.10. Status Updater
2.11. Update Scheduler
2.12. Replenish Rate Controller
2.13. Corrections Controller
2.14. Memories
2.15. Miscellaneous
3.0. Functional Overview
3.1. High-Rate Token adjustment
3.2. Replenishing the Buckets
3.3. Updating Full Counters and Status Information
3.4. Using the Status Information
3.5. Miscellaneous
4.0. Implementation Examples
4.1. Example Update Selection Techniques
4.2. Example Walk-through
4.3. Power-Saving
5.0. Example Embodiments
6.0. Implementation Mechanism—Hardware Overview
7.0. Extensions and Alternatives

1.0. GENERAL OVERVIEW

Approaches, techniques, and mechanisms are disclosed for task management in a computer system, such as traffic management in a networking device, using efficient bucket-based counting mechanisms. According to an embodiment, the techniques described herein enable implementation of bucket-based counting mechanisms in high access rate systems using low cost memories. Among other aspects, the techniques shift at least some of the memory requirements for accounting and tracking to lower cost memories, at the cost of an acceptable reduction in accuracy at a given moment in time on account of potential delays in updates to the accounting and tracking mechanisms.

According to an embodiment, a token bucket or leaky bucket is maintained at least partially through the use of two separate counters. Each of the counters has varying resolution and access capabilities. A first counter, also known as full resolution counter, bucket counter, or full counter, is maintained in relatively lower cost memory. The full counter generally indicates the number of tokens, or fractional tokens, contained by the token bucket, but on a potentially delayed basis. A second counter of smaller size, also known as an intermediate counter, delta counter, partial counter, or shallow counter, is stored in a relatively higher cost memory that supports high arrival and departure rates for accurate accounting. The intermediate counter indicates the amount of tokens or fractional tokens consumed by entities bound to the bucket, and is updated whenever this amount changes. Various adjustment processes may have write access to the intermediate counter, such as processes that remove (or add) tokens, or portions thereof, as needed for performing tasks. A background process is configured to update the full counter from the corresponding intermediate counter on a periodic, scheduled, or other basis. The replenishing (or leaking) of tokens to (or from) the bucket may be performed either as an adjustment process against the intermediate counters, or as part of the background update process.

Any number of buckets may be maintained in the same manner. Each bucket has its own full counter and intermediate counter, meaning that, on the whole, an implementing system will have a set of full counters and a corresponding set of intermediate counters. The exact times at which a given full counter is updated may vary in accordance with a variety of suitable algorithms, such as those described herein. For instance, the updating of the full counters may be optimized such that the full counters for certain buckets are updated more frequently than for other buckets.

The exact types of memories used to store the counters may vary between embodiments, so long as the memory used to store the intermediate counters supports higher read and/or write access rates than the memory used to store the full counters.

Task management and/or other logic may involve utilizing the full counters to determine various status information for a given task classification, in spite of the fact that the full counters are not always up-to-date. This status information may indicate whether the bucket corresponding to the classification is in one or more defined states, such as conforming, non-conforming, depleted, full, and so forth. Each given state is associated with a threshold. If the full counter surpasses the threshold, the bucket is said to be in the given state. In an embodiment, some or all of the status information for a bucket may be determined and stored when the full counter is updated, so that the determination need not be repeated until the next update to the full counter, thus avoiding or at least reducing the need to read the full counter between updates. In an embodiment, the status information for a bucket may be stored in any memory having faster read access than the memory used to store the full counter for the bucket, including without limitation the same memory used to store the intermediate counter for the bucket.

In an embodiment, different buckets may be configured for different purposes. For example, a single task classification may have multiple buckets—such as a first bucket used to ensure that a minimum performance guarantee is met and a second bucket used to enforce a maximum performance rate. Different replenishment (or leak) rates may be assigned to different classifications or types of buckets. In an embodiment, different thresholds may exist for the same state for different buckets. Depending on the embodiment, the state thresholds and/or replenishment (or leak) rates may be pre-configured, and/or updated over time in accordance with various rules and algorithms. In an embodiment, the rates and/or thresholds may be stored in a memory of relatively low cost, including without limitation the same memory used to store the full counters.

In other aspects, the invention encompasses computer apparatuses and computer-readable media configured to carry out the foregoing techniques.

In one embodiment the techniques described herein may be more specifically used to enforce traffic shaping and/or policing when processing messages in a networking device such as a router or switch. For explanatory purposes, the techniques described below are described with respect to such example contexts. That is, the example "tasks" to be performed are message processing tasks, such as routing, manipulating, inspecting, or otherwise processing a message, the example "task classifications" are "traffic action control group" categories, and the example task management processes are enforcing traffic management rules or algorithms. The tokens in general correspond to a number of messages (e.g. packets or cells) or a number of bytes. Some embodiments may optionally utilize fractional tokens, in which portions of tokens may be added or removed from buckets. Any described process that increments or decrements tokens should be understood as being equally applicable to both whole tokens and fractional tokens.

Nonetheless, the techniques described herein may be utilized in any system comprising any number and type of tasks, task classifications, and task management processes, and the examples given below should be understood as being extendable to the implementation of bucket-based mechanisms in any such system. For instance, in another embodiment, the task may be a requested CPU processing task, the task classification may be an application or thread, and the tokens may correspond to CPU cycles or memory units. Moreover, the described techniques may be generally utilized for implementing any variant of the token bucket algorithm or leaky bucket algorithm.

2.0. STRUCTURAL OVERVIEW

FIG. 1 is an illustrative view of various aspects of an example system 100 in which the techniques described herein may be practiced, according to an embodiment. System 100 comprises one or more computing devices. These one or more computing devices comprise any combination of hardware and software configured to implement the various logical components described herein, including components 110-190. For example, system 100 may be a single networking computing device, such as a router or switch, in which some or all of the processing components described herein are implemented using application-specific integrated circuits (ASICs) or field programmable gate arrays (FPGAs). As another example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Messages

System 100 comprises one or more message queues 120 of messages 125. Messages 125 need not necessarily be complete messages from the perspective of an end-user, but rather the term message as used herein should be understood to refer to any unit of data involved in a transmission, such as segments, packets, data frames, cells, datagrams, and so forth. The messages 125 are typically received from external network devices over one or more networks via one or more undepicted communication interfaces of system 100, though messages 125 may also originate from within system 100.

The messages 125 are said to have various characteristics, which vary depending on the embodiment. These characteristics may include, without limitation, incoming or outgoing ports, incoming or outgoing addresses, service classes, protocols, timestamps, assigned action control groups, traffic flows, flags, labels, and so forth. The characteristics may be discernable from the messages themselves (e.g. from header and/or payload data), specified by metadata associated with the messages, and/or inherent from the queue 120 in which a message 125 resides.

The messages 125 are placed in the one or more queues 120. The messages 125 may have been placed in the one or more queues 120 for a variety of reasons—for instance, some or all of the messages 125 may have just been received by the system 100, or another processing component may have placed some or all of the messages 125 in the one or more queues 120 after some initial processing. The one or more queues 120 may be implemented within any suitable memory or storage structure. In embodiments with multiple queues 120, messages 125 may be routed to different queues 120 using any of a variety of assignment mechanisms, based on any suitable characteristic(s) of the messages 125. For example, in an embodiment, there may be a separate queue 120 for each possible group 195.

2.2. Traffic Action Controls

System 100 is configured to support a plurality of different traffic action control groupings. Each message is associated with one or more of the groups, and different traffic action controls may be applied to messages depending on with which group(s) the messages are associated. For instance, traffic action controls may be implemented to stop traffic due to traffic exceeding an allocated rate target for a certain group, drop traffic due to traffic exceeding an allocated rate target for a certain group, ensure that an entity (port, queue, etc.) associated with a certain group has received a desired rate target, mark packets as droppable or of lower priority when traffic exceeds an allocated rate target for a certain group, and so forth.

To this end, system 100 may include a traffic action control table 190 or other suitable data structure identifying each of a plurality of different traffic action control groups 195. Messages 125 are assigned to different groups 195 based on one or more of their characteristics. Hence, in one aspect, each group 195 is a group of messages 125. Various rules and constraints may then be enforced with respect to messages 125 on a per-group 195 basis, including traffic shaping and traffic policing rules.

Traffic Action Control table 190 may be stored in any suitable memory or storage. Though depicted as a separate data structure, traffic action table 190 may actually be stored in a same table or other data structure with other information described herein, such as rates 168, bucket states 176, and so forth.

Although system 100 is described with respect to action control groups 195, the techniques may be applied to any grouping of messages 125, whether or not the grouping is actually labeled an "action control group." For instance, the techniques may be utilized to apply traffic management to per-port groupings, per-flow groupings, or groupings based on other characteristics. Groups 195, and more generally, the term "action control group" should thus be understood to refer to any grouping of messages 125.

2.3. Message Processing

System 100 further comprises one or more message processing subsystems 110. A processing subsystem 110 is a set of hardware components, such as ASICs or FPGAs, and/or software-based processes executed by one or more processors. A processing subsystem 110 is configured to perform some task related to handling of a message 125. For instance, processing subsystem 110 may be or include, without limitation, one or more of: a routing subsystem configured to forward routable messages to next destinations, a buffering component configured to buffer messages while waiting for a port or interface to become available to send the messages, a firewall subsystem configured to apply firewall rules and/or inspect packets, a packet manipulation subsystem, a general purpose processor, and so forth. Of course, the types of processing subsystems 110 that may be implemented may take a variety of other forms, and many embodiments are not limited to any specific type of processing subsystem 110.

Different messages 125 may be processed by different processing subsystems 110 depending on factors such as message characteristics and current bucket states 176. For instance, there may be different processing subsystems 110 for certain action control groups 195. Moreover, the one or more message processing subsystems 110 may actually be one of any number of sets of message processing subsystems within a network device. Messages 125 may have already been processed by other processing subsystems of the network device prior to entering queue 120, and/or may be forwarded to yet other processing subsystems of the network device. For instance, message processing subsystem 110 may be a packet manipulation subsystem that is configured to forward packets, once manipulated, to another subsystem for sending via an applicable outgoing port. Each subsystem may or may not include its own traffic management mechanism. For instance, in an embodiment, a network device may include multiple systems 100 chained together, configured to process a message 125 in series.

2.4. Traffic Management

System 100 further comprises one or more traffic management subsystems 130 configured to determine when and/or if specific messages 125 are to be processed by a message processing subsystem 110. For example, messages 125 may be stored in a queue 120 while waiting to be processed by a message processing subsystem 110. The one or more traffic management subsystems 130 determine when and/or if to release a message 125 from queue 120 to a message processing subsystem 110. A traffic management subsystem 130 may be configured to accept messages from multiple queues 120, or from a single queue 120, depending on the embodiment.

In an embodiment, instead of being stored in queues, messages are simply processed by traffic management subsystem 130 as the messages are received by traffic management subsystem 130, and categorized according to different groups as the traffic management subsystem 130 evaluates the messages. Such a traffic management subsystem 130 may be configured to determine whether to pass a received message through, drop the received message, mark the received message (e.g. changing its priority via 802.1p, DSCP, EXP, etc.), or take other suitable actions in accordance to the techniques described herein, A traffic management subsystem 130 is a set of hardware components, such as ASICs or FPGAs, and/or software-based processes executed by one or more processors. There may be any number of traffic management subsystems 130, and in at least one embodiment, each action control group 195 may have its own traffic management subsystem 130. A traffic management subsystem 130 may or may not be implemented by the same hardware components as a processing subsystem 110, depending on the embodiment. Multiple traffic management subsystems 130 may act upon a message 125 in a series, in some embodiments. For instance, a first traffic management subsystem 130 may implement a traffic shaper. Once the message 125 has been released by the traffic shaper, the message 125 may be directed to a traffic policer implemented by a second traffic management subsystem 130. In an embodiment, there may be multiple levels of traffic shaping. For example, there may be one shaper for every queue 120 and one shaper for a group of queues (e.g. a group of queues associated with a particular port).

A traffic management subsystem 130 may utilize different techniques to determine when to release a message 125, depending on the embodiment. Generally, these techniques involve selecting the next message 125 within a queue 120, determining which action control group 195 is assigned to the message 125 based on message characteristic(s) (if not inherent from the queue 120 or traffic management subsystem 130), and then determining a current bucket state for the action control group 195. The current bucket state may be determined by accessing the bucket state indicator 176 for the action control group 195, or by comparison of a full count 162 for the action control group 195 to a threshold, in manners such as described in subsequent sections.

Based upon the current bucket state, a traffic management subsystem 130 may take any of a number of actions that impact when the message 125 will be processed by message processing subsystem 110. For instance, if the traffic management subsystem 130 is a traffic shaper, traffic management subsystem 130 may delay releasing message 125 until the current bucket state indicates that the action control group 195 assigned to the message is in a conforming state. As another example, if the traffic management subsystem 130 is a traffic policer, the traffic management subsystem 130 may reassign the message 125 to a different traffic class, discard the message 125, apply special marking to the message 125 (e.g. to indicate a downstream action to perform on the message 125, indicate that an entity associated with the message 125 is receiving traffic above a given rate, etc.), and so forth, depending on both the current bucket state and the policy or policies that the traffic management subsystem 130 has been configured to implement.

More generally, a traffic management subsystem 130 may be utilized to limit data transmission to a maximum allowable bandwidth or to guarantee a minimum bandwidth. When utilized to limit transmissions to a maximum bandwidth, a conforming current bucket state indicates that the maximum configured bandwidth has not been exceeded, and that data transmission is therefore allowed. By contrast, when utilized to guarantee a minimum bandwidth, a conforming current bucket state indicates that the amount of data transmitted has not yet fulfilled the minimum guarantee. Thus data transmission should be given higher priority over traffic action control groups whose minimum bandwidth guarantees have already been fulfilled. The one or more traffic management subsystems 130 may be configured for either of these objectives in isolation, or for both objectives together, in which case an action control group 195 may have different buckets (and different bucket states) for the different objectives.

2.5. Full Counters

As described above, traffic management decisions may be made on the basis of the amount of tokens in a conceptual bucket, including token buckets and/or leaky buckets. To this end, system 100 is configured to maintain one or more logical buckets for each action control group 195. In embodiments with multiple buckets, each bucket may correspond to a different traffic management objective (e.g. traffic shaping versus traffic policing, or minimum bandwidth versus maximum bandwidth). Or, multiple buckets can be used together to monitor and act on traffic based on different traffic attributes, such as monitored average rate versus monitored peak rate, for different traffic management objectives.

The bucket-based mechanisms that may be utilized by system 100 rely upon full counters 162 to track the total numbers of tokens in the logical buckets for action control groups 195. Full counters 162 may include one or more full counters 162 for each action control group 195. Each full counter 162 indicates an amount of tokens in a different bucket assigned to the associated action control group 195. For instance, the counter 162 labeled CountA would count the amount of tokens in a bucket for the action control group 195 labeled GroupA.

The count in a given full counter 162 may be accurate as of a last sample time for the bucket that corresponds to the given full counter 162. However, a full counter 162 for an action control group 195 is not necessarily updated each time tokens are added to or removed from the corresponding bucket. Hence, at any given time, the full counter 162 is not necessarily an accurate count of the amount of tokens in a bucket at that given time. The full counter 162 may thus be characterized as indicating an "approximate," "delayed," or "fuzzy" count of the amount of tokens assigned to the corresponding bucket.

2.6. Bucket Status Information

Full counters 162 are used to determine status information for each bucket (and, by extension, the corresponding action control group 195). In an embodiment, traffic management subsystem 130 may be configured to determine the status information based on comparing the full counters 162 to one or more thresholds, such as thresholds 166. In other embodiments, the status information is determined by another subsystem, such as status updater 142, and then stored as state indicators 176.

In any case, the determined status information includes at least one state for each action control group 195. That is to say, the status of each action control group 195 is characterized with respect to one or more defined states. For example, for each type of bucket (i.e. each different objective for which a bucket is maintained), the state of the bucket may be identified as either "conformant" or "non-conformant." Within the context of token buckets, the bucket may be considered conformant when tokens are still available for withdrawal from the bucket, as indicated by the value of the corresponding full counter 162 being above zero (or an applicable threshold). Within the context of leaky buckets, the bucket may be considered conformant when there is still capacity within the bucket to add tokens, as indicated by the value of the corresponding full counter 162 being below the capacity of the bucket, which is specified by an applicable threshold.

In an embodiment, each state indicator 176 may be a binary bit, indicating whether or not the bucket is in a state corresponding to the state indicator 176. In another embodiment, each state indicator 176 may be more than one bit, allowing for more complex states, or indicating that the bucket is a specifically enumerated state in a set of mutually exclusive states. For instance, instead of simply being either "conforming" or "non-conforming," a bucket may be in a state such as "high," "medium," "low," "none," or any other suitable state, each potentially associated with its own traffic management rules.

For each state, one or more thresholds 166 are defined. For instance, a threshold 166 may be a value against which a full counter 162 is compared. If the full counter 162 is above (or, in some embodiments, equal) to the threshold 166, the bucket corresponding to the full counter 162 (and by extension the corresponding action control group 195) is said to be in the state associated with the threshold 166. As another example, thresholds 166 may define one or more ranges, lists, or sets of values associated with different states.

In an embodiment, thresholds 166 may be different for different buckets. For example, each action control group 195 may have a leaky bucket of a potentially different capacity. Or, to account for delay and/or other factors, different token buckets may be considered "empty" at different thresholds. For instance, a bucket for GroupA may be considered empty when ten tokens still remain, while tokens may still be considered available for another bucket for GroupA, or for a bucket for GroupB, even when a deficit of ten tokens exists.

2.7. Intermediate Counters

As mentioned, full counters 162 may not always accurately reflect the amount of tokens in a bucket. To track changes to the amount of tokens assigned to a bucket between sample times, an intermediate counter 172 is kept for each bucket, meaning that one or more intermediate counters 172 are maintained for each action control group 195. An intermediate counter 172 may be adjusted in response to a number of different events. For instance, each time traffic management subsystem 130 forwards a message 125 to message processing subsystem 110, the intermediate counter(s) 172 for the action control group 195 associated with message 125 may be incremented (in the case of leaky buckets) or decremented (in the case of token buckets) by an amount of tokens, which may be a whole number or a fraction thereof. The amount of tokens may be the same for each message 125, or be a function of the size of the message 125 (e.g. a number of bits or bytes).

Depending on the embodiment, an intermediate counter 172 may also be adjusted in response to a number of other events, including without limitation periodic replenishment operations and post-processing correction operations, as described in other sections.

2.8. High-Rate Token Adjustment

System 100 further comprises one or more high-rate token adjustment subsystems 150. A high-rate token adjustment subsystem 150 (also referred to as a token adjustor or intermediate counting subsystem) is a set of one or more hardware components and/or software processes configured to update intermediate counters 172 responsive to adjustment requests from any of a number of possible subsystems within system 100, including traffic management subsystem 130. Adjustment requests may indicate whether to add or remove tokens (i.e. increment or decrement the intermediate counter). Adjustment requests may further indicate an amount of tokens to add or remove in certain embodiments. High-rate token adjustor 150 may receive a large number of adjustment requests in a given period of time. High-rate token adjustor 150 receives these requests and sums them with the corresponding intermediate counters 172 accordingly. High-rate token adjustor 150 does so immediately, or on a frequent basis, such as every clock cycle or every other clock cycle.

The high-rate token adjustment subsystem 150 generally updates the intermediate counters 172 unconditionally (e.g. without checking the value of the full counter 162 and bucket status indicator 176). For instance, token adjustment requests may be received and processed even when the state of the bucket is non-conforming.

2.9. Full Count Updater

System 100 further comprises one or more full count updaters 140 (also referred to as a bucket updater). A full count updater 140 is a set of one or more hardware components and/or software processes configured to update the full counters 162 based on the intermediate counters 172. More specifically, full count updater 140 updates a given full counter 162 by adding (or, depending on the embodiment, subtracting) the current value of the corresponding intermediate counter 172 to (or from) the full counter 162. The intermediate counter 172 is then reset to a value of zero.

2.10. Status Updater

In an embodiment, system 100 optionally comprise a status updater 142, which is configured to update state indicators 176. For instance, responsive to updating to a full counter 162 for a bucket, or at other times, status updater 142 may also update the state indicator 176 for the bucket by comparing the new value of the full counter 190 to the appropriate threshold(s) 166. The status updater 142 may be integrated into the full count updater 140, or a separate component of system 100.

2.11. Update Scheduler

The time at which full count updater 140 updates a given full counter 162 is referred to herein as the sample time or update time for the full counter 162 and its corresponding bucket. In an embodiment, system 100 comprises one or more update schedulers 145. An update scheduler 145 is a set of one or more hardware components and/or software processes configured to control the timing of or schedule these update times by instructing a full count updater 140 to perform updates for specific buckets selected by the one or more update schedulers 145 through various selection algorithms. Similarly, update scheduler 145 may also select times for the status updater 142 to update bucket status indicators 176, and these times may or may not correlate to the update time for the bucket's full counter 162. Though depicted as a component that is separate from full count updater 140 and status updater 142, it will be recognized that one or more update schedulers 145 may instead be integrated into the full count updater 140 and/or status updater 142.

Generally, update scheduler 145 is configured to control update times in such a manner that updates to the full counters 162 occur less frequently than updates to the intermediate counters 172. In an embodiment, the updating of the full counters 162 may further be performed asynchronously relative to token adjustment requests. That is, unlike the updating of intermediate counters 172, the updates to the full counters 162 occur on a schedule that is independent from and not responsive to adjustments by the token adjustor 150.

Update scheduler 145 may be configured to select specific buckets to update at specific times in a variety of manners. For instance, full count updater 140 may simply update the full counters 162 on a periodic basis. Or, full count updater 140 may iteratively cycle through the full counters 162 and update them accordingly. In an embodiment, update scheduler 145 may select a certain number of full counters 162 to update each clock cycle (or each set of clock cycles). The specific full counters 162 updated during a given set of clock cycles may be chosen in a variety of manners, such as sequentially, randomly, based on a prioritization scheme, etc. In at least some embodiments, update scheduler 145 may have access to full counters 162, intermediate counters 172, thresholds 166, state information 176, or other information in memories 160 or 170, based upon which update scheduler 145 may make at least some determinations of which buckets to select for update at a given time. In an embodiment, update scheduler 145 schedules updates to full counters 162 only during downtimes, or in response to events such as detecting that the value of an intermediate counter 172 has surpassed some threshold. In an embodiment, update scheduler 145 varies the frequency with which full counters 162 are updated based on factors such as the foregoing.

In an embodiment, the full counters 162 for certain buckets may be updated whenever a token adjustment occurs, while other full counters 162 may be updated in accordance to a schedule such as described herein. Various other examples of techniques for controlling or scheduling updates of the full counters 162 are described in subsequent sections.

Note that, since the full counter 162 and the status indicator 176 may be updated on a delayed basis, the traffic management subsystem 130 may still identify a bucket as conforming at times when the sum of the full counter 162 and the intermediate counter 172 would indicate that the bucket is non-conforming. The traffic management system 130 would thus still release the message 125 and adjust the amount of tokens in the bucket accordingly. A further consequence of this configuration is that, when the next sample time comes, the full counter 162 may surpass (sometimes significantly) its corresponding thresholds 166. For instance, a token bucket may indicate that negative tokens are available, or a leaky bucket may have more tokens than its designated capacity.

2.12. Replenish Rate Controller

System 100 further comprises a replenish rate controller 154 configured to replenish the tokens in a bucket over time in accordance to assigned rate 168. The replenish rate controller 154 effectively controls the rate at which messages 125 belonging to a given action control group 195 can be processed, by adding or removing tokens from the corresponding bucket at a fixed rate over time. For convenience, the term "replenish" is used herein to refer to the repeated addition or deletion of tokens from a bucket based on an assigned rate 168, and the specific act performed by the controller (addition or removal) in the course of replenishing will depend on whether the bucket is a token bucket, in which case token addition is performed, or a leaky bucket, in which case token removal is performed.

Replenish rate controller 154 utilizes stored rate information 168 for each bucket. Rate information 168 may be global, specific to an action control group 195, specific to a bucket type, or specific to each individual bucket. Moreover, rates 168 may change over time in response to input from an administrator and/or automated traffic management logic. Rates 168 are generally expressed in terms of an amount of tokens to replenish over a given unit of time, such as a number of clock cycles or seconds.

Depending on the embodiment, replenish rate controller 154 may request token adjustments by high-rate token adjustor 150, or wait to replenish tokens until full count updater 140 performs an update. In the former case, replenish rate controller 154 may make adjustment requests on a periodic basis, with the requests indicating how many tokens to replenish (as calculated from the relevant rate 158). In the latter case, in addition to adding intermediate counter 172 to full counter 162, full count updater 140 may also add an amount of tokens to replenish, as calculated by replenish rate controller 154 (e.g. based on multiplying the rate by an amount of time that has lapsed since the update time). In either case, replenish rate controller 154 may be a separate component of system 100, or integrated into corresponding one of token adjustor 150 or full count updater 140.

According to an embodiment, instead of full count updater 140 actively requesting that replenish rate controller 154 identify an amount of tokens to replenish, replenish rate controller 154 periodically triggers replenishment events for buckets. Upon the occurrence of a replenishment event (e.g. after a configurable number of clock cycles, which may be global or based on rates 158), replenish rate controller 154 flags each relevant bucket for replenishment. For instance, a replenishment bit may be associated with each full counter 162. Upon detecting during an update to a bucket that the replenishment flag is set, full count updater 140 may calculate the amount of tokens to replenish based on the last update time, and add or delete the tokens accordingly. The flag may then be cleared.

Alternatively, instead of a replenishment flag, a replenishment counter may be maintained. Upon each replenishment event, an amount of tokens is added to (or removed from) the replenishment counter, based on the rate 158 for the bucket. When full count updater 140 updates the bucket, the token balance is transferred from the replenishment counter to the full counter 162 for the bucket.

2.13. Corrections Controller

System 100 may optionally further comprise a post-processing corrections controller 152. Corrections controller 152 makes corrected token adjustments to compensate for any changes that may occur to a message 125 as a result of that message being processed by a message processing subsystem 110. Though depicted as a logically separate component, post-processing corrections controller 152 may in fact be part of processing subsystem 110.

For example, a message processing subsystem 110 may add or remove content to or from a message 125, effectively changing the message size. Traffic management subsystem 130 may already have adjusted the tokens in a corresponding bucket based on the previous seize of the message 125. The bucket-based counting mechanism of system 100 may be configured to ignore this change, or system 100 may optionally account for the change in size by having post-processing corrections controller 152 send a token adjustment request for the difference in size between the original message 125 and processed message 125.

As another example, message processing subsystem 110 may decide to drop a message 125 or reassign a message 125 to a different action control group 195. Post-processing corrections controller 152 may accordingly add an amount of tokens corresponding to the total size of the message 125 back to the bucket to which the message 125 was originally assigned.

2.14. Memories

According to an embodiment, full status counters 162 are stored in a first memory area 160 of relatively low cost, while intermediate counters 172 are stored in a second memory area 170 of higher cost but that supports a faster access rate. Thresholds 166 may also be stored in the first memory area 160, or another memory area of relatively low cost, while status indicators 176 may be stored in the second memory area 170 or another memory area of relatively high cost and faster access rate.

This configuration leverages higher access rate of the second memory 170 to improve the efficiency of system 100 relative to simply using the first memory 160 to store counters and status information. Of course, a simpler approach to leverage the higher access rate of the second memory 170 would be to simply store all full counters 162 and thresholds 166 in the second memory 170, and to update the full counters 162 directly every time they change. However, the storage requirements for the full counters 162 and thresholds within the second memory 170 may be undesirably large. On the other hand, assuming sample times occur frequently enough, the storage requirements for each intermediate counter 172 may be much smaller than the number of bits required to store a full counter 162. Similarly, the storage requirements for a status indicator 176 may be much less than the storage requirements for a threshold 166. Hence, a much smaller amount of memory 170 is needed to take advantage of the higher access rates afforded by memory 170 using the described techniques.

In an embodiment, the maximum possible value of each intermediate counter is a function of the update strategy used by the update scheduler 145. Hence, the size of each intermediate counter 172 in the second memory 170 can be selected to be no bigger than necessary to store the maximum possible value of that intermediate counter 172. In an embodiment, the algorithm(s) utilized by update scheduler 145 may be such that certain buckets are guaranteed to be updated more frequently. Since certain buckets are guaranteed to be updated more frequently, the intermediate counters may accordingly be of varying sizes.

Moreover, in accordance with certain described techniques, the number of accesses to the full counters 162 and thresholds 166 can be greatly reduced to mitigate the impact of using the slower first memory 160 to store the full counters 162 and thresholds 166. While the intermediate counters 172 and status indicators 176 may be accessed any time traffic management is performed, which may be quite frequently, the full counters 162 and thresholds 166 may not actually need to be accessed at times other than their respective sample times. Thus the one or more memories 160 need not support the same high access rates as the intermediate counters 172 and status indicators 176.

On the other hand, not all embodiments require that counters 162 and 172 be stored in separate memories in order to realize certain advantages of the described techniques.

According to an embodiment, for convenience and potential reduction in read/write times, the threshold(s) 166 and/or refresh rates 168 for a bucket may be stored in close proximity to the full counter 162 for the bucket (e.g. in a same record, in a same addressable unit of memory, in consecutive units of memory, etc.). Similarly, status information 176 for a bucket may be stored in close proximity to the intermediate counter 172 for the bucket.

According to an embodiment, full counters 162 and thresholds 166 are stored in single-ported Static Random Access Memories ("SRAM"), which allow for higher frequency clock cycles. To enable use of the single-ported memoires, alternating cycles of read and write accesses are used to read, adjust, and write back each full counter 162. A small number of clock cycles are dedicated between the read and write accesses to perform calculations and make the necessary adjustments. By using the inherent low area characteristic of single-ported SRAM compared to more complex storage alternatives with the same dimensions, such an embodiment allows for a higher number of token buckets supported over other bucket-based implementations of comparable area. For scalability, the embodiment can be used as a building block to support a large number of token buckets without the loss of area efficiency within the design.

In another embodiment, two-port memories are used for full counters 162 for higher access rates, while still supporting more than two updates in a clock cycle to a given full counter 162. In yet other embodiments, any sort of multi-ported memory may be utilized.

According to an embodiment, intermediate counters 172 and status information 176 are stored in multi-ported registers, such as flip-flops. On account of the high accessibility of these registers, in contrast to the relatively limited accessibility of single port, two-port, or dual port SRAMs, many different sources within system 100 can make adjustments to the same token bucket (via its intermediate counter 172) in the same cycle. Multiplexing logic maybe utilized to update the intermediate counters 172, and collision detection and accumulation logic may be used to resolve adjustments targeting the same intermediate counter 172.

However, other embodiments may have yet other memory configurations.

2.15. Miscellaneous

System 100 as described above illustrates only some of the many possible arrangements of components that may be configured to provide the functionality described herein. Other arrangements may include fewer, additional, or different components, and the division of work between the components may vary depending on the arrangement. For example, although illustrated as separate components for conceptual purposes, logic for implementing components 130-150 may in fact be executed by a single component. As another example, in some embodiments, thresholds 166 and status indicators 176 may be omitted, along with any other components relied upon exclusively by the omitted component(s). As another example, intermediate counters 172 may be stored in a different memory than status indicators 176, and/or thresholds 166 may be stored in a different memory than full counters 162.

In an embodiment, there may be multiple types of buckets. Hence, counters and statuses may be tracked for multiple types of buckets concurrently, and traffic management decisions may be preconditioned on checking statuses for multiple buckets with respect to which the resource is needed. In an embodiment, not all of action control groups 195 are regulated. That is, messages 125 associated with certain action control groups 125 may be processed without traffic management. Hence, the full counters 162 and other bucket information need not be maintained for these action control groups 195.

In an embodiment, there may also or instead be multiple types of action control groups 195 described by multiple traffic action tables 190. Hence, counters and statuses may be tracked for multiple types of action control groups 195 concurrently, and traffic management decisions may be preconditioned on checking statuses for multiple action control groups 195 associated with a message 125.

3.0. FUNCTIONAL OVERVIEW

In an embodiment, the efficiency of traffic management in a networking device is increased using a bifurcated counting technique to track the states of token buckets.

Figure 2:
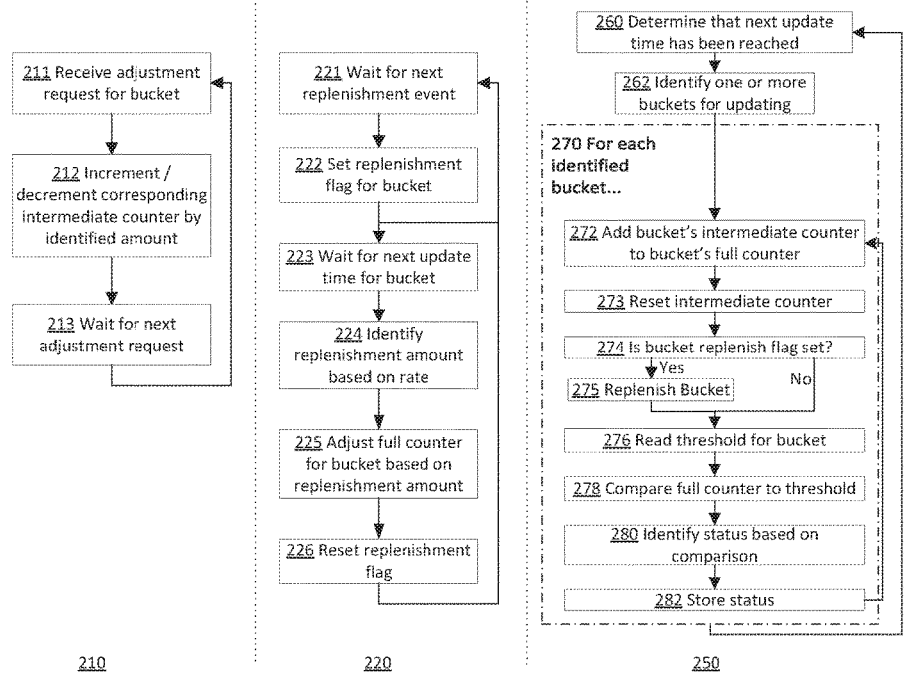
FIG. 2 illustrates example flows for implementing a bucket-based counting mechanism.

FIG. 2 illustrates example flows 210, 220 and 250 for implementing a bucket-based counting mechanism, according to an embodiment. Flows 210, 220, and 250 are performed in parallel, concurrently with one another. The various elements of flow 210, 220, and 250 may furthermore be performed concurrently for different types of buckets and/or traffic control mechanisms, such that any number token buckets are tracked in parallel.

The various elements of flows 210, 220, and 250 may be performed in a variety of systems, including systems such as system 100 described above. In an embodiment, each of the processes described in connection with the functional blocks described below may be implemented using digital logic and/or one or more computer programs or other software elements, in any of a general-purpose computer or a special-purpose computer, while performing data retrieval, transformation, and storage operations that involve interacting with and transforming the physical state of memory in the computer.

Flows 210, 220, and 250 illustrate only some of the possible techniques for implementing increasing the efficiency of bucket-based counting mechanisms. Other flows may involve additional or fewer elements, in potentially different arrangements. For illustrative purposes, flow 210, 220, and flow 250 are described below with respect to the example of traffic in a networking device. However, as previously explained, the techniques are also applicable to a wide variety of systems in which tasks may be managed using a token bucket, leaky bucket, or similar construct.

3.1. High-Rate Token Adjustment

Flow 210 is a flow for making high rate adjustments to intermediate counters, such as to intermediate counters 172. Flow 210 begins with block 211, which comprises receiving an adjustment request for a bucket. The adjustment request may be received for a number of reasons. For instance, traffic management logic such as implemented by traffic management subsystem 130 may have determined to release or forward a message in a message queue. In response, the logic may have determined an amount of tokens (e.g. a function of the message size) needed to perform an associated traffic action, such as holding, dropping, or marking the message, and requested to remove the corresponding amount of tokens from a specific token bucket that corresponds to the message, or to add the corresponding amount to a leaky bucket that corresponds to the message. As another example, the adjustment request may be a request to correct a previous adjustment for a message in view of changes to the message after the message was processed.

The adjustment request may take any suitable form. The request may target a bucket specifically (e.g. by identifier or the address of the bucket's intermediate counter in memory), or the request may target or be mapped to an action control group, in which case the relevant bucket(s) are identified using a mapping of action control groups to buckets. The request may, in some embodiments, target multiple buckets, such as a request to update a bucket for a shaper associated with a queue and a bucket for a shaper associated with a port to which the queue is bound. The request may identify a specific amount of tokens. In some embodiments, no amount need be specified, as each message is assumed to correspond to a same amount of tokens. In an embodiment, the request may take the form of a write operation to the bucket's intermediate counter address in memory. In another embodiment, the request is processed by another component, which is in turn responsible for issuing a write operation.

Block 212 comprises, in response to the request of block 211, adjusting the intermediate counter for the bucket by the requested amount. The adjusting may comprise, for instance, incrementing or decrementing the intermediate counter by the requested amount, depending on the type of bucket being used and the implementation of the algorithm.

Flow 210 then proceeds to block 213, which comprises waiting for the next adjustment request. Flow 210 returns to block 211 upon receiving the next request, which may or may not be for the same bucket.

3.2. Replenishing the Buckets

Flow 220 is a flow for replenishing a bucket in accordance to a data rate associated with the bucket (e.g. minimum performance guarantees or a maximum performance limits). As explained above, the act of replenishing, as used herein, varies depending on whether token buckets or leaky buckets are used. If token buckets are used, the act of replenishing involves adding tokens to the bucket. If leaky buckets are used, the act of replenishing involves removing the tokens from the bucket.

Flow 220 begins with block 221, which comprises waiting for a next replenishment event. A replenishment event may occur periodically and/or in response to certain triggers. A replenishment event may occur for each bucket at the same time, or for different buckets individually. For instance, replenishment events may occur for a number of buckets each clock cycle. Or, different buckets may have replenishment events at different times based on their associated replenishment rates.

In response to a replenishment event, in block 222, a replenish flag is set for a bucket. Although a replenish flag is set for each bucket with respect to which the replenishment event occurs, for simplification, the remaining blocks of flow 220 are described with respect to a single bucket. The replenish flag may be, for example, a binary bit, a count of replenishment events, or an amount of tokens to replenish. If the flag is in fact an amount of tokens to replenish, the amount to add to the flag may be identified from replenishment rate information for the bucket.

Block 223 comprises waiting for the next update time for the bucket (i.e. when the bucket is selected for updating in block 270). In the course of waiting in block 223, note that it is possible that blocks 221 and 222 may optionally be repeated a number of times in embodiments where the replenishment flag is more than a single bit.

Block 224 comprises identifying an amount of tokens to replenish to the bucket. The identifying may involve, for instance, accessing replenishment rate information associated with the bucket, identifying a last time the bucket was replenished, and calculating the amount of tokens based on multiplying the rate times the difference between the current time and the last replenishment time. As another example, the identifying may involve determining how many replenishment events have occurred since the bucket was last replenished, and multiplying the number of replenishment events by an amount of tokens to replenish in each period, as may be indicated by the replenishment rate. As yet another example, if the replenishment flag is being used as a token counter (i.e. indicating an amount of tokens to replenish), the amount may simply be identified from the flag itself.

Block 225 comprises adjusting a full counter, such as full counter 162, for the bucket based on the replenishment amount identified in block 224. Again, depending on the type of bucket being used, this may involve incrementing or decrementing the full counter.

In an embodiment, the adjustment of block 225 may be constrained so as to ensure that the amount of tokens for a bucket does not fall below a certain threshold or does not exceed a certain threshold. For example, in one leaky bucket embodiment, if the adjustment would result in the amount of tokens in the bucket falling below 0 (or some other minimum threshold), the bucket may be set to 0 instead. As another example, the amount of tokens within a token bucket may be limited to a global or bucket-specific maximum.

Block 226 comprises resetting the replenishment flag. Flow 220 then returns block 221 to wait for the next replenishment event.

3.3. Updating Full Counters and Status Information

Flow 250 is a flow for updating full counter and status information for buckets. Flows 210 and flow 250 are performed on an ongoing basis during the operation of the system in which they are implemented. However, flow 250 may be performed less frequently and/or asynchronously relative to flow 210. For instance, flow 210 may be performed in response to each token adjustment request, while flow 250 is performed periodically or on some other schedule independent of token adjustment requests.

Flow 250 begins with block 260. Block 260 comprises determining that a next update time has been reached. Block 260 may occur, for example, on a periodic basis, such as once every clock cycle, once every other clock cycle, once every n clock cycles, every second, and so forth. Block 260 may also or instead occur at previously scheduled times. Block 260 may also or instead occur in response to certain events, such as detecting that an intermediate counter is above a threshold, or detecting that a measure of processor utilization is below a certain percentage.

Block 262 comprises identifying one or more buckets whose counters and status information are to be updated. For instance, the buckets may be arranged in an arbitrary "round-robin" sequence, and each iteration of flow 250 may involve selecting a next bucket in the sequence, or a next group of buckets in the sequence. Once the sequence is complete, the sequence may be repeated. Thus, for example, a first and second bucket may be chosen in the first iteration of flow 250, a third and fourth bucket may be chosen in the second iteration of flow 250, and so forth, until the end of the sequence is reached, and the first two buckets are selected again. A variety of other techniques of varying sophistication may also or instead be used to identify the one or more buckets, and these techniques are described in greater detail in subsequent sections.

In an embodiment, a fixed number of buckets are selected in each iteration. In other embodiments, there is a maximum number of buckets that may be selected, but fewer than the maximum number of buckets may instead be selected. Any number of buckets may be selected, including zero or one. In some embodiments, the efficiency of the described techniques may be increased when significantly fewer than the total number of buckets are selected. When choosing the fixed number of buckets to update per iteration, consideration may be taken of a number of factors, such as the amount of memory used to store the intermediate counters, the maximum amount of error that is acceptable in full counters, the amount of processing resources needed to perform the updating, and so forth.

Block 270 comprises updating the counters and status information for each identified bucket. In an embodiment, block 270 comprises, for each identified bucket, performing blocks 272-282.

Block 272 comprises adding a bucket's intermediate counter to the bucket's full counter. As a result of the intermediate counter being updated in response to each message during the ongoing performance of flow 200, the intermediate counter should at any given time reflect the net change in tokens assigned to the bucket since the bucket's full counter was last updated (i.e. since the full counter's last sample time). Thus, in some embodiments, adding the intermediate counter to the full counter may result in the full counter at least temporarily storing an accurate count of tokens assigned to the bucket. The full counter may thus be viewed as a snapshot of the amount of tokens assigned to the bucket at the bucket's last sample time. Note that, if the intermediate counter is in fact negative in value on account of a greater amount of tokens having been removed from the bucket since the bucket's status was last updated, the result of block 272 is that the full counter will decrease.

According to some embodiments, updates to full counters may be optimized utilizing a read-modify-write operation such that only two memory access are required of the slower memory. A read operation reads the current full counter value. This value is then incremented by the corresponding intermediate counter value. The updated full counter may then be written back to the same location. In an embodiment, the read-modify-write operation may be accomplished in a single clock cycle if two-ported memory is used to store the full counter. In other words, a first memory port is used to read the current value of the full counter, and a second memory port is used for writing back the updated value. In another embodiment, the read-modify-write operation may be performed over two clock cycles if single-ported memory is used to store the full counter. That is, on the first cycle, the memory port is used to read the current value of the full counter, while on the next cycle, the updated value is written back using the same memory port. This embodiment supports higher operating frequencies for the memory used to store the full counter, at the expense of reducing the rate at which full counters may be updated, thus increasing the potential amount of inaccuracy in the full counters.

Block 273 comprises resetting the intermediate counter to zero, since the intermediate counter counts token adjustments since the last sample time, and the last sample time by definition has just occurred. In an embodiment, blocks 272 and 273 may be performed using a transaction or other locking mechanism designed to ensure that no token adjustments occur between block 272 and block 273, which would effectively result in the token adjustments not being counted. However, in other embodiments, the expected loss in accuracy from such occurrences is small enough in both magnitude and cost to warrant foregoing any locking mechanism.

Block 274 comprises determining whether a replenishment flag is set for the bucket. The replenishment flag may have been set, for instance, as a result of block 222 in flow 220. If the replenishment flag is set, then flow 250 proceeds to block 275. Otherwise, flow 250 proceeds to block 260. In block 275, the bucket is replenished. For example, block 275 may comprise performing blocks 224 through 226.

Block 276 comprises reading threshold information for a bucket's state. For example, block 276 may comprise reading a threshold 166. Depending on the embodiment, thresholds may be read at the same time as the full counter, or at separate times. Block 278 comprises comparing the full counter, as updated in block 272, to the threshold information. Block 280 comprises, based on the comparison, identifying status information for the bucket, such as conforming or non-conforming. Block 282 comprises storing the status information.

For example, the threshold read in block 276 may indicate a value below which a bucket is considered to be in an actionable state. Block 278 may thus comprise determining whether the full counter for the bucket is below the threshold value. Block 280 may comprise setting a bit for the traffic action state to 0 or 1, depending on whether full counter is above the threshold value. In other embodiments, more complex thresholds and comparisons may be involved in identifying the status of the bucket, such as thresholds based on ranges and/or that define non-binary states.

In an embodiment, blocks 276-282 may be repeated for any number of possible states for a bucket.

3.4. Using the Status Information

Figure 3:
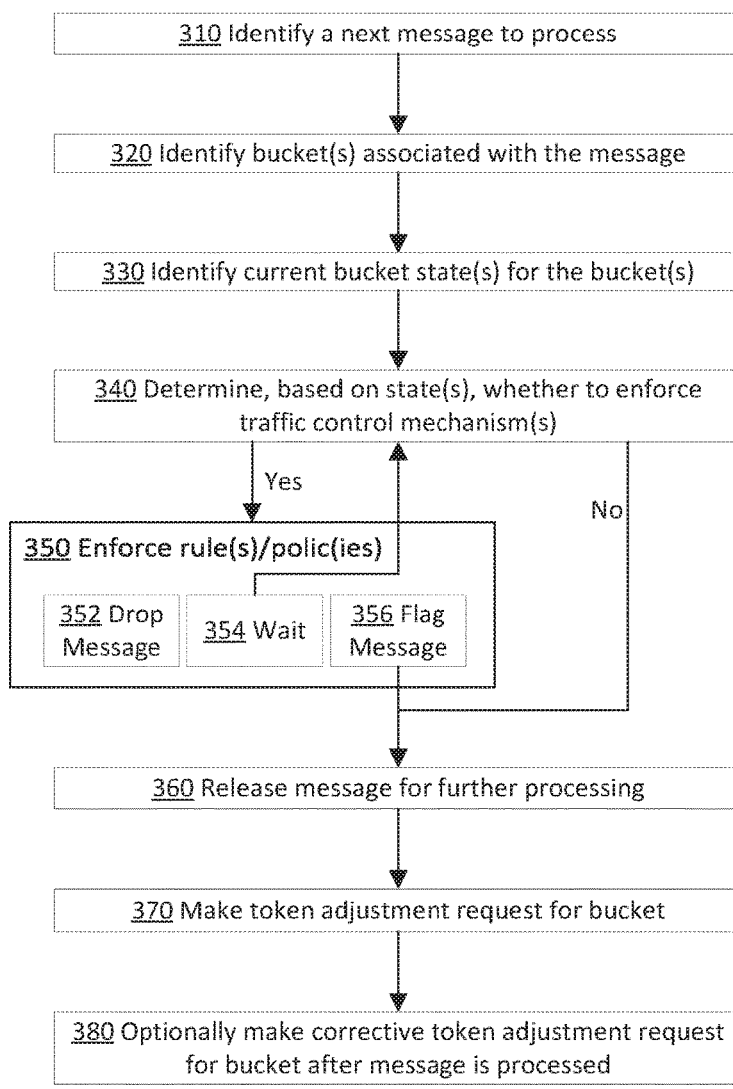
FIG. 3 illustrates a flow for using bucket status information to manage network traffic.

FIG. 3 illustrates a flow 300 for using bucket status information to manage network traffic, according to an embodiment. Flow 300 may be used, for example, in conjunction with flows for tracking the counts of buckets, such as flow 210, 220, and 250. Flow 300 is but one example of a suitable flow for using bucket status information. Other flows may include fewer or additional elements in varying arrangements.

Flow 300 may be performed in a variety of systems, including systems such as system 100 described above. For instance, flow 300 may be performed by traffic management subsystem 130. In an embodiment, each of the processes described in connection with the functional blocks described below may be implemented using digital logic and/or one or more computer programs or other software elements, in any of a general-purpose computer or a special-purpose computer, while performing data retrieval, transformation, and storage operations that involve interacting with and transforming the physical state of memory in the computer.

Block 310 comprises identifying a next message to process. The message may be identified, for example, because it is the next message in a physical or logical queue, such as queue 120. Or, the message may be selected through one or more filtering and/or sorting processes.

Block 320 comprises identifying one or more buckets associated with the message. Identifying a bucket may comprise, for instance, identifying a flow, action control group, or other grouping associated with the message based on characteristics of the message, as described in other sections, and identifying the bucket that is associated with that grouping.

Block 330 comprises identifying a current bucket state for each identified bucket. In embodiments where status information is cached in some memory, such as in embodiments where blocks 276-280 of flow 250 are performed, the state may be read directly from the memory. In other embodiments, the state may be determined by comparing a full counter for the bucket to a threshold for the bucket, as described in other sections.

Block 340 comprises, based on the state(s), determining whether to enforce one or more traffic control mechanisms (i.e. rules or policies). The exact logic utilized to make this determination will vary depending on the embodiment and the rules being enforced. For instance, the logic may simply enforce a rule or policy if a state is considered to be conforming, and not enforce the rule or policy if the state is not considered to be conforming. Or, the state may be one of a number of other signals that is considered when determining whether to enforce a rule or policy. In embodiments with more complex states, a state may indicate to enforce one rule or policy, but not another, or a state may indicate to enforce all relevant rules or policies.

If a rule or policy is to be enforced, then flow proceeds to block 350 to enforce the applicable rule(s) or polic(ies). Enforcing a rule or policy may comprise performing one or more actions with respect to the message. Any suitable action may be performed, and the examples shown in block 350 are non-limiting examples. One example is illustrated in block 352, which comprises simply dropping the message, as may be performed in traffic policing embodiments. For instance, the message may automatically be dropped if the message is in a non-conforming state. Or, there may be non-conforming states of varying degrees, and the message may be dropped only when the bucket is in a highest non-conforming state. Flow 300 may terminate at block 352.

Another example is illustrated in block 354, which comprises waiting a predetermined period of time and returning to block 340 to determine if the current state of the bucket now permits the message to be released. In other words, blocks 340 and 354 collectively involve waiting until the bucket is in a conforming or other designated state, as may be performed with respect to a traffic shaper. Block 354 may or may not be blocking with respect to the performance of flow 300 for other messages associated with the bucket.

Another example is illustrated in block 356, in which the message is marked with a traffic control flag. This flag may indicate that the message is to receive special treatment when processed by subsequent components. For instance, the flag may indicate that the message may optionally be dropped if resources become congested, or that the message is to be sent with a lower priority.

If no rules or policies are to be enforced, or after the enforcing of certain types of rules or policies in block 350, flow may proceed from block 360, in which the message is released to another component for further processing. For instance, the message may be released for sending, inspection, manipulation, or processing by other traffic management mechanisms.

Assuming the message is released, then in block 370, a request to adjust the tokens in the bucket is made. The amount of tokens to remove (or add) to the bucket may be selected based on the size of the message (e.g. proportional to the number of bits in the message), or the same amount of tokens may be used for all messages. The request may occur at any time relative to block 360. The intermediate counter may then be adjusted using a flow such as flow 210.

Block 380, which is optional, comprises sending a corrected adjustment request to reflect changes in the size of the message by other processing components after the performance of block 370. Again, the intermediate counter may then be adjusted using a flow such as flow 210.

In an embodiment, multiple buckets may be associated with a message. For instance, the action control group to which the message is assigned may have different buckets to enforce different traffic management rules or policies. In such embodiments, the message may be passed in series from one traffic management mechanism to another, each performing its own iteration of blocks 320-360. Or, a single traffic management component may repeat blocks 320 and 330 for each bucket, in parallel or series, and the determination of block 340 may be based on the bucket states collectively. In either case, the particular bucket identified in block 320 would be selected on a particular traffic action logic that is being implemented in the current iteration. For instance, if maximum bandwidth rules are being enforced, a maximum bandwidth bucket might be chosen, whereas a minimum bandwidth bucket would be selected when enforcing minimum bandwidth rules.

3.5. Miscellaneous

In an embodiment, blocks 221, 222, 226, 274, and 275 may be optional, in that no replenishment flag is set. Such embodiments assume that block 224 is always performed in place of blocks 274 and 275, and that block 225 will be performed as well, unless the identified replenishment amount is 0.

In an embodiment, instead of replenishing tokens through direct manipulation of the full counter per flow 220, replenishment is performed by making an adjustment to the intermediate counter for the bucket, which is processed using flow 210. For instance, a replenishment controller may wait for a next replenishment event, in similar manner to block 221. When the event occurs, an amount to replenish the bucket for the replenishment event is identified from the bucket's rate. Instead of setting a replenishment flag, the replenishment controller may make an immediate adjustment request such as described with respect to block 211.

Both the frequency with which flow 250 is performed and the number of full counters that are updated in each pass of flow 250 may, in some embodiments, be adjusted. These factors, as well as the frequency with which token adjustments may occur, may be utilized to select a suitable size (e.g. number of bits) for the intermediate counters, so as to ensure that the intermediate counters do not grow to a value larger than can be stored. Conversely, the frequency with which full counters are updated may be adjusted dynamically based on the sizes of the intermediate counters and/or the whether any intermediate counters are at risk to exceed their maximum values.

In an embodiment, different processes or components may be responsible for updating the full counters and the status information. That is, there may be one component executing one flow 250 for updating full counters without performing some or all of blocks 274-282, and another component executing another flow 250 for updating statuses without performing some or all of blocks 272-275.

In an embodiment, instead of making adjustments upon forwarding the message to a next processing component in block 370, the adjustments may be requested by the next processing component itself, thus avoiding the need for a corrected adjustment request. In an embodiment, the adjustment request may even be delayed until the message is sent out from the networking device. Regardless of what action triggers the adjustment request, however, since the result of sending the message to a next processing component will typically be that the message will eventually be sent from the network device, the adjustment may more generally be said to have been made in association with the sending of the message from the network device, and therefore responsive to the sending, even if technically occurring before the sending.

Example accounting techniques described herein use calculations such as incrementing and decrementing, or comparisons such as greater than or less than. It will be recognized that other types of calculations and comparisons may be used to achieve equivalent results. For instance, a token bucket may be kept on the basis of negative instead of positive numbers, or an intermediate counter may be kept in such a manner that it is to be added rather than subtracted from a full counter. Such variations are also within the scope of the described techniques.

4.0. IMPLEMENTATION EXAMPLES

4.1. Example Update Scheduler Techniques

As explained previously, a variety of techniques may be used by an update scheduler to identify the one or more buckets whose counter(s) require updating in a given update cycle (e.g. in a given iteration of flow 250). For instance, the buckets may be arranged in an arbitrary "round-robin" sequence, and selected accordingly. As another example, the identified buckets may be selected at random.

As yet another example, the identified buckets may be the buckets whose intermediate counters have the highest magnitude. This approach is also referred to as a "FindMax" approach. For instance, the buckets may be sorted by value or absolute value of their respective intermediate counters. Or, the identified buckets may be a set of buckets whose intermediate counters values are over (or below) a current threshold.

Hybrid selection techniques may also be utilized. For example, every odd iteration of flow 250 may involve selecting a random set of buckets, or the next set of buckets in an arbitrary round-robin sequence, while every even iteration may involve selecting the buckets having the highest current magnitude or highest replenish rate. Or, every first iteration may involve selecting a pre-defined and specific set of buckets, while every second and third iteration may involve selecting the next buckets in the round-robin sequence. As yet another example, one bucket updated in every iteration may be selected from an arbitrary round-robin sequence, another bucket updated in every iteration may be selected from a group of buckets dynamically calculated to be high-priority buckets, and another bucket updated in every iteration may be selected from a group of manufacturer-designated high priority buckets.

More generally, the hybrid selection technique may alternate between two or more selection strategies in different iterations, or between utilizing multiple selection techniques to select multiple buckets in a single iteration. Certain strategies may even be repeated or utilized more frequently than others.

In an embodiment, hybrid selection techniques may be designed so as to include, either in a single iteration or over the course of multiple iterations, both buckets selected using strateg(ies) intended to ensure that all counters are updated within a certain amount of time (e.g. round robin strategies that cycle through a sequence of all buckets over a given number of iterations), and buckets selected using strateg(ies) that would rarely or never select buckets deemed to be lower in priority. A strategy designed to ensure that all counters are updated within a certain amount of time shall herein be considered to be a baseline strategy, and updates made as a result of this process shall be considered "regular" updates. Strategies utilized as part of a hybrid selection technique outside of the baseline strategy are considered optimizing strategies, and updates made as a result thereof referred may be referred to as irregular updates.

The FindMax strategy is thus one example of a strategy that may be utilized as an optimizing strategy. As another example, rather than sorting by current magnitude, a background process may track the magnitudes of the intermediate counters over time, and periodically sequence the buckets based on their average intermediate counter historical magnitude. An optimizing strategy may thus select the bucket(s) with highest average intermediate counter historical magnitude. As another example, an optimizing strategy may select a number of buckets associated with the highest replenishment rates. As yet another example, a user may designate certain buckets as high priority buckets, and an optimizing strategy may thus select these high priority buckets.

Another optimizing strategy may involve sorting the buckets by the differences between their respective full counters and thresholds, such that the bucket(s) that are currently closest to their respective thresholds are selected. As yet another example, the average proximity of a full counter to a threshold may be calculated over time and used to prioritize its corresponding bucket. Buckets may also or instead be sorted by functions that are based on any of the foregoing factors.

As an alternative to sorting buckets by some or all of the foregoing factors, a similar optimizing strategy may be to simply maintain state information indicating when a bucket is currently considered to be of higher priority for update purposes. This "high update priority" state may be updated periodically (e.g. during regular updates to the full counter, in similar manner to the rest of status information 176). The buckets may then be arranged in a sequence. This sequence may omit buckets that are not currently in the high update priority state. Or, any buckets within the sequence that are not within the high update priority state may be ignored during the selection process. For instance, a bucket may be considered to be in the high update priority state when it is within a certain amount or percentage of its threshold. The amount may be, for instance, the maximum possible error amount in the bucket's full counter (as calculated based on the baseline strategy) or a function thereof. The bucket would thus be available for selection by an optimizing selection technique, whereas a bucket not in the high update priority state would not be selectable.

As another optimizing strategy, or even as an alternative to a hybrid selection technique, a weighted or biased selection strategy may be utilized. Buckets may be prioritized by data rate, value of a replenishment flag or counter, intermediate counter magnitude, average intermediate counter magnitude, current full counter threshold proximity, average full counter threshold proximity, current state, user priority designations, bucket type, predicted use, and/or any other factor. The buckets may be assigned weights based on these priorities. A weighted or biased approach to scheduling, such as a weighted lottery random selection algorithm or a weighted round-robin sequence, may then be used to select the buckets in block 262.

For example, a networking device may include both action control groups that have a 10 Mbps maximum data rate, and action control groups that have a 100 Mbps maximum data rate. The action control groups may be weighted differently for scheduling purposes. Updates may be scheduled in a weighted fashion such that the 100 Mbps rate action control groups are more likely (e.g. 2× more likely, 10× more likely, etc.) to be updated in any given iteration than the 10 Mbps action control groups. That is, for instance, a schedule may be designed whereby different buckets may be assigned to different schedule slots. Assuming the 100 Mbps ports are weighted 10:1 relative to the 10 Mbps ports, for every ten schedule slots assigned to a 100 Mbps port, a 10 Mbps port would be assigned to one schedule slot. This approach may be hybridized with one or more other approaches, such as the FindMax approach described above.

According to an embodiment, the programmable update scheduler allows for the configuration of a higher frequency of updates to be made to buckets associated with high data-rate action control groups. This higher frequency of updates reduces the worst-case latency observed from when a token adjustment is made to when the corresponding bucket state is updated, which improves the overall accuracy of the solution.

According to an embodiment, the update scheduler optionally does not update a bucket in certain circumstances, such as the magnitude of bucket's intermediate counter being below an update threshold. If the bucket is scheduled for an update at a time when magnitude of bucket's intermediate counter being below an update threshold, the update scheduler may simply skip updating of any bucket at that time, or request the identity of a new bucket to update. In an embodiment, the update threshold is zero, meaning that an update will be performed unless the intermediate counter has not changed at all. In an embodiment, a full counter may still be updated if a replenishment flag or counter is set.

According to an embodiment, instead of utilizing a round-robin approach, the baseline strategy may be used to select buckets whose full counters are most stale. For instance, the times of bucket updates or number of clock cycles since a bucket was last updated may be tracked. The baseline approach may select the bucket(s) whose time or number of clock cycles since last being updated is largest.

The actual determination of which bucket(s) are to be updated may occur as needed (e.g. in the same clock cycle or period as the bucket is needed), or in advance. As an example of the latter, a resource update controller subsystem may separately generate and update an array of schedule slots. The resource update controller subsystem may populate the slots with bucket-identifying information in a sequence based on one or more of the foregoing techniques. When it comes time to perform an update, the resource updating subsystem may "pop" the identity of the next bucket(s) to update off the array. Empty slots may be generated to indicate periods when no updates are to be performed. As yet another example, a resource update controller may generate and maintain an internal schedule of times to perform updates for specific buckets, and command a resource updating subsystem to perform updates for the specific buckets when their scheduled times arrive.

Figure 4:
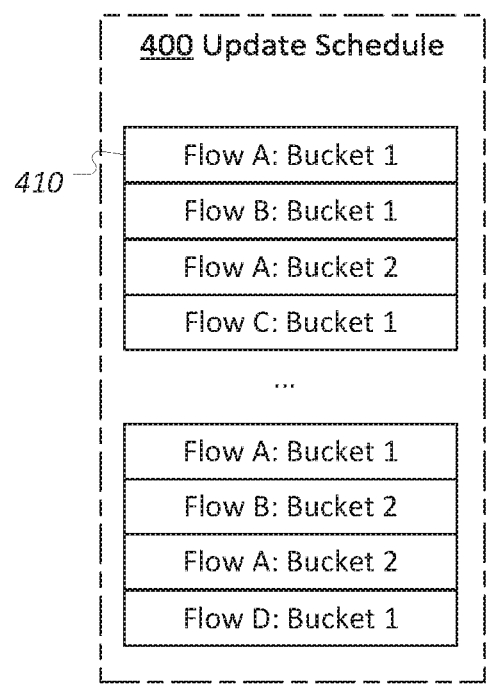
FIG. 4 illustrates an example set of counters and status information changing over time in accordance with the described techniques.

For example, FIG. 4 illustrates an example schedule 400 for updating buckets, according to an embodiment. Schedule 400 is essentially an array of entries 410. A current bucket row pointer 450 traverses to the next entry 410 in schedule 400 each time a full count update process is executed. The entry 410 indicates which bucket should be updated for the current full count update process. More than one entry 410 can be associated with a given action control group. For instance, different entries may correspond to different buckets used to the maximum bandwidth limit and minimum bandwidth guarantee traffic shapers for each sub-queue of a data port. Higher data-rate action control groups appear more frequently than lower data-rate action control groups. In the example schedule 400, Flow A is a high data-rate action control group with two entries 410 dedicated to it. Flow B is a medium data-rate action control group also with two entries 410. Flows C and D are low data-rate action control groups, each with a single entry 410 assigned.

4.2. Example Walk-Through

FIG. 5 is a diagram 500 that illustrates an example set of counters and status information changing over time in accordance with the described techniques, according to an embodiment. Diagram 500 more specifically depicts counters and other information for buckets 590, labeled as O1 through O8. For each bucket 590, a full counter 562 and threshold 566 are stored in a first memory location (e.g. a lower cost memory), and an intermediate counter 572 and state bit 576 are stored in a second memory location (e.g. a higher cost memory). For simplification of discussion, all data is depicted in decimal form rather than as bits or bytes. Nonetheless, as illustrated, the amount of memory (i.e. the number of bits or bytes) used to store intermediate counters 572 is significantly smaller than used to store full counters 562, on account of assumptions that the update process illustrated herein prevents the intermediate counters 572 from growing more than a certain amount.

FIG. 5 depicts the state of the foregoing with respect to four instances in time, referred to as t0 through t3. Each time corresponds to a new update. The times may be evenly incremented. For instance, each time may correspond to a new clock cycle, or a new set of clock cycles, in a succession of clock cycles. Or, the times may be times at which updates have been scheduled, without necessarily being evenly incremented.

At t0, full counters 562 have full counter values 562a, intermediate counters 572 have intermediate counter values 572a, and state bits have state bit values 576a. As illustrated by the bolded outlining of their corresponding data, two buckets have been recently updated—O1 and O2. These buckets were selected for update using a round-robin approach. Their corresponding intermediate counter values 572a have been reset to 0. The state bit values 576a for O2 and O4 are set, on account of their corresponding full counter values 562a being higher than their respective thresholds 566.

At t1, a number of token adjustments have occurred since t0. For each token adjustment, the intermediate counter 572 has been increased or decreased by an amount corresponding to the size of a message. These token adjustments have resulted in net increases to intermediate counter values 572b for certain intermediate counters 572 (e.g. for O1 and O5), and net decreases to the intermediate counter values 572b for other certain intermediate counters 572 (e.g. for O2 and O8) relative to t0. For example, one token has been removed from O2, lowering its intermediate counter value 572b to −01, while two tokens have been added to O7, raising its intermediate counter value 572b to 00.

Buckets O3 and O4 have been selected for update at t1. Consequently, the values of their intermediate counters 572a from t0 have been added to the values of their full counters 562a from t0 to arrive at the full counter values 562b for O3 and O4. Meanwhile, their intermediate counter values 572b have been reset to 0.

Furthermore, at t1, the full counters 562b for O3 and O4 have been compared to their respective threshold values 566. This comparison has indicated that the full counter values 562b for neither O3 nor O4 are above their respective thresholds 566, and thus the respective state bit values 576b for O3 and O4 are not set. This means, for instance, that the state bit 576b for O4 is now different than the state bit 576a, since the full counter 562b for O4 (394) has been decreased below the threshold 566 for O4 (400) on account of adding the intermediate counter value 572a for O4 (−07) to the full counter 562 for O4 (401).

All other full counter values 562b and state bit values 576b are not affected by the update to O3 and O4.

At t2, again a number of token adjustments have occurred, resulting in the intermediate counter values 572c. Buckets O5 and O6 are updated, resulting in their full counter values 562c and state bit values 576c. Their intermediate counters 572c have been reset.

At t3, again a number of token adjustments have occurred, resulting in the intermediate counter values 572d. Buckets O5 and O6 are updated, resulting in their full counter values 562*d* and state bit values 576*d*. Their intermediate counters 572*d* have been reset.

The process may then repeat at a time t4, with O1 and O2 again being updated, followed by O3 and O4 at a time t5, and so forth.

It will be noted that, for illustrative purposes, the embodiment depicted in FIG. 5 involves a relatively small number of buckets 590. Other embodiments may include many more buckets 590, along with intermediate counters 572, thresholds 566, and full counters 562 that grow significantly larger in size. Moreover, each bucket 590 may be associated with one or more additional thresholds 566 corresponding to one or more additional state bits 572.

While FIG. 5 illustrates a round-robin update technique, it will also be clear that alternative selection techniques may likewise be implemented, such as described above. For example, a hybrid selection policy may be implemented by selecting two buckets using a round-robin baseline strategy at even times (e.g. t0, t2, etc.), and selecting two "high priority" buckets using an optimizing strategy at odd times (e.g. t1, t3, etc.). For example, supposing O8 and O5 were historically high in data rate, O8 and O5 may be selected at t1 per the optimizing strategy, O3 and O4 would then be selected at t2 per the round-robin strategy, O8 and O5 would then be selected again at t3 per the optimizing strategy, O5 and O6 would be selected at t4 per the round-robin strategy, and so forth. In some embodiments, the pool of high priority buckets may be greater than two, in which case the optimizing strategy may select different buckets each time. Moreover, other embodiments may update a smaller or greater number of buckets than two at each time.

4.3. Power-Saving

According to an embodiment, an update scheduler such as update scheduler 145 may match the rate at which updates are scheduled with the rate of token adjustments, thereby decreasing the amount of token adjustments that need to be accounted for. This minimizes the width of the intermediate counters, thereby reducing the area and power cost incurred from using registers to store the intermediate counters.

According to an embodiment, the programmable update scheduler enables a higher frequency of updates to be made on token buckets associated with high data-rate action control groups or based on activity. Similarly, the update scheduler may be configured to minimize the number of updates made when the updates are not so frequently needed, such as on mid to low data-rate and disabled action control groups, or when no traffic was received during the update window. Thus may result, for example, in periods when no full counters or status indicators are being updated. In so doing, the update scheduler saves power by not executing update processes when the update processes have little to no value.

5.0. EXAMPLE EMBODIMENTS

Examples of some embodiments are represented, without limitation, in the following clauses.

According to an embodiment, a system comprises a task management subsystem configured to determine when and/or whether to perform tasks based on buckets associated with classifications to which the tasks are assigned; one or more first memories configured to store bucket counters for the buckets; one or more second memories configured to store intermediate counters for the buckets, the one or more second memories being different than the one or more first memories, each of the intermediate counters corresponding to a different one of the bucket counters; an intermediate counting subsystem configured to adjust particular intermediate counters for particular classifications by token amounts corresponding to particular tasks having the particular classifications responsive to deciding to perform the particular tasks; a bucket update subsystem configured to update the bucket counters based on respectively corresponding intermediate counters, and to reset the corresponding intermediate counters; and a replenishment subsystem configured to replenish the buckets based on replenishment amounts determined from replenishment rates associated with the classifications.

In an embodiment, the task management subsystem determines when and/or whether to perform tasks based on buckets by accessing status indicators for the buckets, the system further comprising a status update subsystem configured to update the status indicators by comparing the bucket counters to one or more applicable thresholds.

According to an embodiment, a networking apparatus comprises: communication interfaces coupled to one or more networks; a message handling subsystem configured to process messages received over the communication interfaces; a traffic management subsystem configured to apply traffic shaping or traffic policing logic to specific messages of the messages selected based on status indicators associated with traffic action control groups to which the specific messages are assigned; one or more first memories configured to store full counters associated with the traffic action control groups; one or more second memories configured to store intermediate counters associated with the traffic action control groups, the one or more second memories being different than the one or more first memories, each of the intermediate counters corresponding to a different one of the full counters; an intermediate counting subsystem configured to adjust particular intermediate counters for particular traffic action control groups by amounts corresponding to particular messages sent over the communication interfaces in association with the particular traffic action control groups; a full count update subsystem configured to update the full counters based on respectively corresponding intermediate counters, and to reset the corresponding intermediate counters; a replenishment subsystem configured to update the intermediate counters or to update the intermediate counters, based on replenishment amounts determined from replenishment rates associated with the traffic action control groups; and a status update subsystem configured to update the status indicators by comparing the full counters to one or more applicable thresholds.

In an embodiment, the apparatus further comprises an update scheduler configured to identify times for the update subsystem to update specific full counters of the full counters and for the status update subsystems to update specific status indicators of the status indicators, the update scheduler configured to identify the times based on one or more of the replenishment rates and/or magnitudes of the intermediate counters.

In an embodiment, the one or more second memories are further configured to store the status indicators. In an embodiment, the one or more first memories are single-ported memories, wherein the one or more second memories are registers. In an embodiment, the full count update subsystem is configured to only update a limited number of the full counters in a given set of one or more clock cycles, wherein the counting subsystem is not restricted to updating the limited number of the intermediate counters in the given set of one or more clock cycles.

In an embodiment, a given full counter, of the full counters, represents a token bucket for a given traffic action control group, of the traffic action control groups, that is associated with the given full counter; adjusting a given intermediate counter, of the intermediate counters, that corresponds to the given full counter comprises decrementing the given full counter by amounts of tokens needed to send given messages associated with the given traffic action control group; updating the given full counter based on the given intermediate counter comprises adding the given intermediate counter to the given full counter and resetting the given intermediate counter; and updating the given intermediate counter or the given full counter by a given replenishment amount determined based on a given replenishment rate that is associated with the given traffic action control group comprises incrementing the given intermediate counter or the given full counter based on the given replenishment amount.

In an embodiment, a given full counter, of the full counters, represents a leaky bucket for a given traffic action control group, of the traffic action control groups, that is associated with the given full counter; adjusting a given intermediate counter, of the intermediate counters, that corresponds to the given full counter comprises incrementing the given full counter by amounts of tokens needed to send given messages associated with the given traffic action control group; updating the given full counter based on the given intermediate counter comprises adding the given intermediate counter to the given full counter and resetting the given intermediate counter; and updating the given intermediate counter or the given full counter by a given replenishment amount determined based on a given replenishment rate that is associated with the given traffic action control group comprises decrementing the given intermediate counter or the given full counter based on the given replenishment amount.

According to an embodiment, a method comprises regulating the performance of tasks within a computing device using buckets, the buckets being token buckets and/or leaky buckets, the state of the buckets being maintained by storing delayed counters representing how many tokens are in the buckets; storing intermediate counters for the delayed counters that reflect cumulative adjustments to how many tokens are in the buckets since last update times for the delayed counters; and recurrently updating the delayed counters using the intermediate counters.

According to an embodiment, a method comprises: maintaining a delayed bucket counter in a first memory; maintaining a delayed bucket status indicator in one or more registers, other than the first memory; maintaining an intermediate counter in the one or more registers; adjusting the intermediate counter as adjustment events occur; updating the delayed bucket counter and the delayed bucket status less frequently than the adjustment events occur.

According to an embodiment, a method comprises: storing a bucket counter in a first memory; storing an intermediate counter in a second memory; updating the intermediate counter responsive to adjustment events; recurrently updating the bucket counter by adding the intermediate counter to the bucket counter, and resetting the intermediate counter, the updating of the bucket counter being performed less frequently than the updating of the intermediate counter.

In at least some of the above embodiments, the method further comprises: storing a status indicator; recurrently updating the status indicator based on comparing the bucket counter to at least one threshold for the status indicator, the status indicator being updated responsive to the updating of the bucket counter; determining when to perform one or more tasks based on the status indicator.

In at least some of the above embodiments, the method further comprises determining whether to enforce a network traffic control mechanism with respect to messages received at a network device based on the status indicator, wherein the adjustment events comprise processing at least a set of the messages.

In at least some of the above embodiments, the method further comprises replenishing the bucket counter and/or the intermediate counter at an associated replenishment rate.

According to an embodiment, a method comprises: storing full counters in one or more first memories; storing intermediate counters in in one or more second memories; identifying traffic action control groups associated with messages being processed within a networking device, each of the traffic action control groups assigned to at least a different one of the intermediate counters and at least a different one of the full counters; when particular messages, associated with corresponding groups of the traffic action control groups, are forwarded to one or more next components, adjusting respectively assigned intermediate counters; recurrently updating the full counters by combining full counts of the full counters with intermediate counts of the respectively assigned intermediate counters, and resetting the respectively assigned intermediate counters; based on replenishment rates assigned to the traffic action control groups, recurrently replenishing the full counters or recurrently replenishing the intermediate counters; and determining when to enforce a network traffic management rule or policy against a given group, of the traffic action control groups, based at least on a current value of a given full counter, of the full counters, that is assigned to the given group.

In an embodiment, the method further comprises: storing status indicators for the traffic action control groups in the one or more second memories, each of the traffic action control groups assigned to at least a different one of the status indicators; recurrently updating the status indicators for the traffic action control groups based on comparing the respectively assigned full counters for the traffic action control groups to one or more thresholds for corresponding status indicators; wherein determining when to enforce the network traffic management rule or policy comprises determining when to enforce the network traffic management rule or policy based on a given status indicator, of the status indicators, that is assigned to the given group.

In an embodiment, updating the full counters and updating the status indicators are both performed less frequently than particular messages are forwarded. In an embodiment, updating the status indicators comprises updating a given status indicator responsive to updating the given full counter, the given status indicator assigned to the same given group. In an embodiment, the method further comprises updating the full counters and updating the status indicators asynchronously relative to the forwarding the particular messages.

In an embodiment, the one or more thresholds include a first threshold for a first full counter of the full counters and a second threshold for a second full counter of the full counters, the first threshold being different than the second threshold. In an embodiment, the method further comprises: storing the one or more thresholds in the one or more first memories.

In an embodiment, the one or more second memories support higher access rates than the one or more first memories.

In an embodiment, adjusting the respectively assigned intermediate counters comprises, for a particular message, decrementing a particular intermediate counter associated with the particular message based on an amount of tokens associated with the particular message; replenishing the full counters or replenishing the intermediate counters comprises adding amounts of tokens to the full counters or the intermediate counters based on the replenishment rates; and determining when to enforce the network traffic management rule or policy comprises determining to enforce the network traffic management rule or policy after the given full counter falls below a given threshold value.

In an embodiment, adjusting the respectively assigned intermediate counters comprises, for a particular message, incrementing a particular intermediate counter associated with the particular message based on an amount of tokens associated with the particular message; replenishing at least one of the full counters or the intermediate counters comprises removing amounts of tokens from the at least one of the full counters or the intermediate counters based on the replenishment rates; and determining when to enforce the network traffic management rule or policy comprises determining to enforce the network traffic management rule or policy after the given full counter rises above a given threshold value.

In an embodiment, the method further comprises: determining when to enforce multiple network traffic management rules or policies against the given group; wherein multiple full counters, of the full counters, and multiple intermediate counters, of the intermediate counters, are assigned to the given group, each of the multiple full counters having a different replenishment rate, of the replenishment rates; wherein each of the multiple network traffic control rules or policies is associated with a different one of the multiple full counters assigned to the given group.

In an embodiment, the replenishment rates correspond to at least one of: a minimum bandwidth guarantee, a maximum bandwidth limit, or a bandwidth throttling threshold.

In an embodiment, the traffic action control groups are groupings of messages selected based on one or more of: incoming ports, outgoing ports, traffic classes, protocols, incoming addresses, outgoing addresses, traffic flow identifiers, or message queues.

In an embodiment, enforcing the network traffic control rule or policy comprises one or more of: delaying a message, dropping a message, flagging a message, or changing a service class of a message.

In an embodiment, updating the full counters comprises periodically selecting, from the full counters, at least a particular full counter to update, wherein over the course of a plurality of periods, each full counter of the full counters is selected. In an embodiment, periodically selecting, from the full counters, at least a particular full counter comprises selecting first full counters of the full counters in a predetermined order. In an embodiment, periodically selecting, from the full counters, at least a particular full counter comprises selecting second full counters of the full counters out of the predetermined order, based on one or more optimizing algorithms. In an embodiment, periodically selecting, from the full counters, at least a particular full counter comprises selecting first full counters of the full counters based on magnitudes of their corresponding intermediate counters. In an embodiment, periodically selecting, from the full counters, at least a particular full counter comprises selecting first full counters of the full counters based on respectively assigned replenishment rates of the full counters. In an embodiment, periodically selecting, from the full counters, at least a particular full counter comprises selecting a fixed number objects in each period of the plurality of periods.

In an embodiment, updating the intermediate counters comprises incrementing and decrementing intermediate counters by amounts greater than one.

Other examples of these and other embodiments are found throughout this disclosure.

6.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, or FPGAs with custom programming to accomplish the techniques.

Though the foregoing techniques are described with respect to a hardware implementation, which provides a number of advantages in certain embodiments, it will also be recognized that, in another embodiment, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 6:
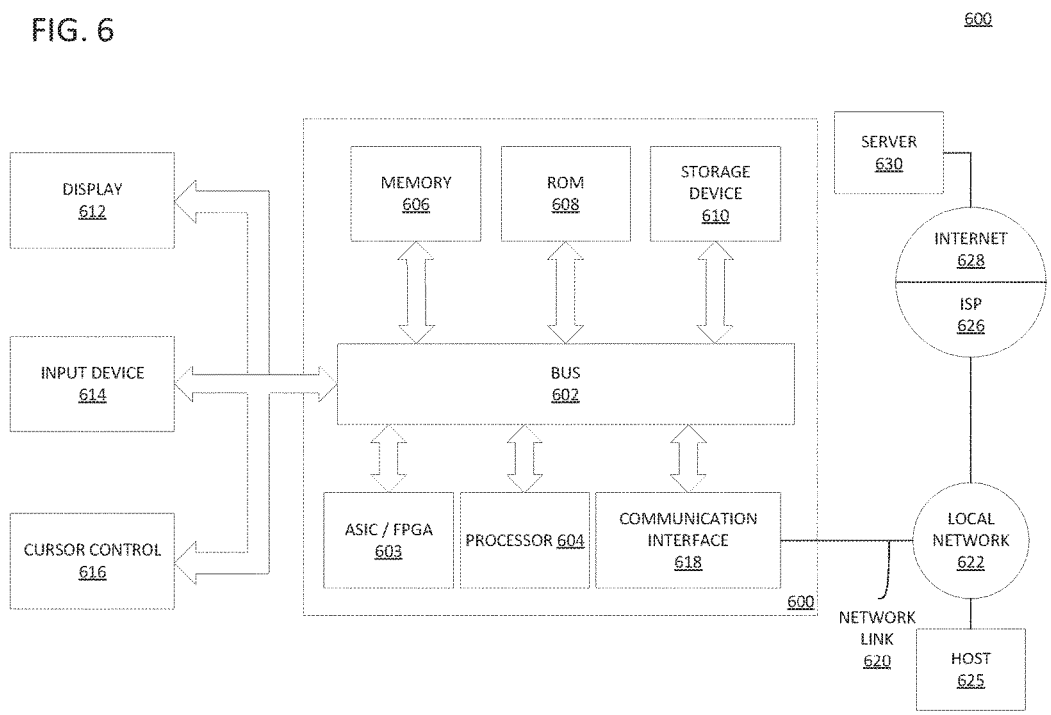
FIG. 6 is block diagram of a computer system upon which embodiments of the invention may be implemented.

FIG. 6 is a block diagram that illustrates a computer system 600 that may be utilized in implementing the above-described techniques, according to an embodiment. Computer system 600 may be, for example, a desktop computing device, laptop computing device, tablet, smartphone, server appliance, computing mainframe, multimedia device, handheld device, networking apparatus, or any other suitable device.

Computer system 600 may include one or more ASICs, FPGAs, or other specialized circuitry 603 for implementing program logic as described herein. Additionally, and/or instead, computer system 600 may include one or more hardware processors 604. Computer system 600 may also include one or more busses 602 or other communication mechanism for communicating information. Busses 602 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 600 also includes one or more memories 606, such as a random access memory (RAM), registers, or other dynamic or volatile storage device for storing data units to be processed by the one or more ASICs, FPGAs, or other specialized circuitry 603. Memory 606 may also or instead be used for storing information and instructions to be executed by processor 604. Memory 606 may be directly connected or embedded within circuitry 603 or a processor 604. Or, memory 606 may be coupled to and accessed via bus 602. Memory 606 also may be used for storing temporary variables, data units describing rules or policies, or other intermediate information during execution of program logic or instructions.

Computer system 600 further includes one or more read only memories (ROM) 608 or other static storage devices coupled to bus 602 for storing static information and instructions for processor 604. One or more storage devices 610, such as a solid-state drive (SSD), magnetic disk, optical disk, or other suitable non-volatile storage device, may optionally be provided and coupled to bus 602 for storing information and instructions.

A computer system 600 may also include, in an embodiment, one or more communication interfaces 618 coupled to bus 602. A communication interface 618 provides a data communication coupling, typically two-way, to a network link 620 that is connected to a local network 622. For example, a communication interface 618 may be an integrated services digital network (ISDN) card, cable modem, satellite modem, or a modem to provide a data communication connection to a corresponding type of telephone line. As another example, the one or more communication interfaces 618 may include a local area network (LAN) card to provide a data communication connection to a compatible LAN. As yet another example, the one or more communication interfaces 618 may include a wireless network interface controller, such as a 802.11-based controller, Bluetooth controller, Long Term Evolution (LTE) modem, and/or other types of wireless interfaces. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by a Service Provider 626. Service Provider 626, which may for example be an Internet Service Provider (ISP), in turn provides data communication services through a wide area network, such as the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

In an embodiment, computer system 600 can send messages and receive data through the network(s), network link 620, and communication interface 618. In some embodiments, this data may be data units that the computer system 600 has been asked to process and, if necessary, redirect to other computer systems via a suitable network link 620. In other embodiments, this data may be instructions for implementing various processes related to the described techniques. For instance, in the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. As another example, information received via a network link 620 may be interpreted and/or processed by a software component of the computer system 600, such as a web browser, application, or server, which in turn issues instructions based thereon to a processor 604, possibly via an operating system and/or other intermediate layers of software components.

Computer system 600 may optionally be coupled via bus 602 to one or more displays 612 for presenting information to a computer user. For instance, computer system 600 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 612 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 612.

One or more input devices 614 are optionally coupled to bus 602 for communicating information and command selections to processor 604. One example of an input device 614 is a keyboard, including alphanumeric and other keys. Another type of user input device 614 is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Yet other examples of suitable input devices 614 include a touch-screen panel affixed to a display 612, cameras, microphones, accelerometers, motion detectors, and/or other sensors. In an embodiment, a network-based input device 614 may be utilized. In such an embodiment, user input and/or other information or commands may be relayed via routers and/or switches on a Local Area Network (LAN) or other suitable shared network, or via a peer-to-peer network, from the input device 614 to a network link 620 on the computer system 600.

As discussed, computer system 600 may implement techniques described herein using customized hard-wired logic, one or more ASICs or FPGAs 603, firmware and/or program logic, which in combination with the computer system causes or programs computer system 600 to be a special-purpose machine. According to one embodiment, however, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 600 can receive the data on the network and demodulate the signal to decode the transmitted instructions. Appropriate circuitry can then place the data on bus 602. Bus 602 carries the data to main memory 606, from which processor 604 retrieves and executes the instructions. The instructions received by main memory 606 may optionally be stored on storage device 610 either before or after execution by processor 604.

7.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A networking apparatus comprising:
   communication interfaces coupled to one or more networks;
   a message handling subsystem configured to process messages received over the communication interfaces;
   a traffic management subsystem configured to apply traffic shaping or traffic policing logic to specific messages of the messages selected based on status indicators associated with traffic action control groups to which the specific messages are assigned;
   one or more first memories configured to store full counters associated with the traffic action control groups;
   one or more second memories configured to store intermediate counters associated with the traffic action control groups, the one or more second memories being different than the one or more first memories, each of the intermediate counters corresponding to a different one of the full counters;
   an intermediate counting subsystem configured to adjust particular intermediate counters for particular traffic action control groups by amounts corresponding to particular messages sent over the communication interfaces in association with the particular traffic action control groups;
   a full count update subsystem configured to update the full counters based on respectively corresponding intermediate counters, and to reset the corresponding intermediate counters;
   a replenishment subsystem configured to update the intermediate counters or to update the full counters, based on replenishment amounts determined from replenishment rates associated with the traffic action control groups;
   a status update subsystem configured to update the status indicators by comparing the full counters to one or more applicable thresholds.

2. The apparatus of claim 1, further comprising an update scheduler configured to identify times for the full count update subsystem to update specific full counters of the full counters and for the status update subsystems to update specific status indicators of the status indicators, the update scheduler configured to identify the times based on one or more of the replenishment rates and/or magnitudes of the intermediate counters.

3. The apparatus of claim 1, wherein the full count update subsystem is configured to only update a limited number of the full counters in a given set of one or more clock cycles, wherein the intermediate counting subsystem is not restricted to updating the limited number of the intermediate counters in the given set of one or more clock cycles.

4. The apparatus of claim 1,
   wherein a given full counter, of the full counters, represents a token bucket for a given traffic action control group, of the traffic action control groups, that is associated with the given full counter;
   wherein adjusting a given intermediate counter, of the intermediate counters, that corresponds to the given full counter comprises decrementing the given full counter by amounts of tokens needed to send given messages associated with the given traffic action control group;

wherein updating the given full counter based on the given intermediate counter comprises adding the given intermediate counter to the given full counter and resetting the given intermediate counter;

wherein updating the given intermediate counter or the given full counter by a given replenishment amount determined based on a given replenishment rate that is associated with the given traffic action control group comprises incrementing the given intermediate counter or the given full counter based on the given replenishment amount.

5. The apparatus of claim 1, wherein a given full counter, of the full counters, represents a leaky bucket for a given traffic action control group, of the traffic action control groups, that is associated with the given full counter;

wherein adjusting a given intermediate counter, of the intermediate counters, that corresponds to the given full counter comprises incrementing the given intermediate counter by amounts of tokens needed to send given messages associated with the given traffic action control group;

wherein updating the given full counter based on the given intermediate counter comprises adding the given intermediate counter to the given full counter and resetting the given intermediate counter;

wherein updating the given intermediate counter or the given full counter by a given replenishment amount determined based on a given replenishment rate that is associated with the given traffic action control group comprises decrementing the given intermediate counter or the given full counter based on the given replenishment amount.

6. The apparatus of claim 1, wherein the one or more second memories are further configured to store the status indicators;

wherein the one or more first memories are single-ported memories;

wherein the one or more second memories are registers.

7. A method comprising:

storing full counters in one or more first memories;

storing intermediate counters in one or more second memories;

identifying traffic action control groups associated with messages being processed within a networking device, each of the traffic action control groups assigned to at least a different one of the intermediate counters and at least a different one of the full counters;

when particular messages, associated with corresponding groups of the traffic action control groups, are forwarded to one or more next components, adjusting respectively assigned intermediate counters;

recurrently updating the full counters by combining full counts of the full counters with intermediate counts of the respectively assigned intermediate counters, and resetting the respectively assigned intermediate counters;

based on replenishment rates assigned to the traffic action control groups, recurrently replenishing the full counters or recurrently replenishing the intermediate counters;

determining when to enforce a network traffic management rule or policy against a given group, of the traffic action control groups, based at least on a current value of a given full counter, of the full counters, that is assigned to the given group.

8. The method of claim 7, further comprising:

storing status indicators for the traffic action control groups in the one or more second memories, each of the traffic action control groups assigned to at least a different one of the status indicators;

recurrently updating the status indicators for the traffic action control groups based on comparing the respectively assigned full counters for the traffic action control groups to one or more thresholds for corresponding status indicators;

wherein determining when to enforce the network traffic management rule or policy comprises determining when to enforce the network traffic management rule or policy based on a given status indicator, of the status indicators, that is assigned to the given group.

9. The method of claim 8, wherein updating the full counters and updating the status indicators are both performed less frequently than the particular messages are forwarded.

10. The method of claim 8, wherein updating the status indicators comprises updating the given status indicator responsive to updating the given full counter.

11. The method of claim 8, further comprising updating the full counters and updating the status indicators asynchronously relative to the forwarding the particular messages.

12. The method of claim 8, wherein the one or more thresholds include a first threshold for a first full counter of the full counters and a second threshold for a second full counter of the full counters, the first threshold being different than the second threshold.

13. The method of claim 12, further comprising storing the one or more thresholds in the one or more first memories.

14. The method of claim 7, wherein the one or more second memories support higher access rates than the one or more first memories.

15. The method of claim 7, wherein adjusting the respectively assigned intermediate counters comprises, for a particular message, decrementing a particular intermediate counter associated with the particular message based on an amount of tokens associated with the particular message;

wherein replenishing the full counters or replenishing the intermediate counters comprises adding amounts of tokens to the full counters or the intermediate counters based on the replenishment rates;

wherein determining when to enforce the network traffic management rule or policy comprises determining to enforce the network traffic management rule or policy after the given full counter falls below a given threshold value.

16. The method of claim 7, wherein adjusting the respectively assigned intermediate counters comprises, for a particular message, incrementing a particular intermediate counter associated with the particular message based on an amount of tokens associated with the particular message;

wherein replenishing at least one of the full counters or the intermediate counters comprises removing amounts of tokens from the at least one of the full counters or the intermediate counters based on the replenishment rates;

wherein determining when to enforce the network traffic management rule or policy comprises determining to enforce the network traffic management rule or policy after the given full counter rises above a given threshold value.

17. The method of claim 7, wherein the method further comprises:
- determining when to enforce multiple network traffic management rules or policies against the given group;
- wherein multiple full counters, of the full counters, and multiple intermediate counters, of the intermediate counters, are assigned to the given group, each of the multiple full counters having a different replenishment rate, of the replenishment rates;
- wherein each of the multiple network traffic control rules or policies is associated with a different one of the multiple full counters assigned to the given group.

18. The method of claim 7, wherein the replenishment rates correspond to at least one of: a minimum bandwidth guarantee, a maximum bandwidth limit, or a bandwidth throttling threshold.

19. The method of claim 7, wherein the traffic action control groups are groupings of messages selected based on one or more of: incoming ports, outgoing ports, traffic classes, protocols, incoming addresses, outgoing addresses, traffic flow identifiers, or message queues.

20. The method of claim 7, wherein enforcing the network traffic control rule or policy comprises one or more of: delaying a message, dropping a message, flagging a message, or changing a service class of a message.

21. One or more non-transitory computer-readable media storing instructions that, when executed by one or more computer devices, cause:
- storing full counters in one or more first memories;
- storing intermediate counters in one or more second memories;
- identifying traffic action control groups associated with messages being processed within a networking device, each of the traffic action control groups assigned to at least a different one of the intermediate counters and at least a different one of the full counters;
- when particular messages, associated with corresponding groups of the traffic action control groups, are forwarded to one or more next components, adjusting respectively assigned intermediate counters;
- recurrently updating the full counters by combining full counts of the full counters with intermediate counts of the respectively assigned intermediate counters, and resetting the respectively assigned intermediate counters;
- based on replenishment rates assigned to the traffic action control groups, recurrently replenishing the full counters or recurrently replenishing the intermediate counters;
- determining when to enforce a network traffic management rule or policy against a given group, of the traffic action control groups, based at least on a current value of a given full counter, of the full counters, that is assigned to the given group.

* * * * *

UNITED STATES PATENT AND TRADEMARK OFFICE
CERTIFICATE OF CORRECTION

PATENT NO. : 10,432,429 B1
APPLICATION NO. : 15/290769
DATED : October 1, 2019
INVENTOR(S) : Matthews et al.

Page 1 of 1

It is certified that error appears in the above-identified patent and that said Letters Patent is hereby corrected as shown below:

In the Claims

Column 36
Claim 2: Line 47: Delete "subsystems" and insert --subsystem--

Signed and Sealed this
Nineteenth Day of November, 2019

Andrei Iancu
*Director of the United States Patent and Trademark Office*